United States Patent
Shimizu

(10) Patent No.: US 7,027,375 B2
(45) Date of Patent: Apr. 11, 2006

(54) MULTI-VALUE DATA RECORDING AND REPRODUCING DEVICE

(75) Inventor: Akihiko Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 401 days.

(21) Appl. No.: 10/407,190

(22) Filed: Apr. 7, 2003

(65) Prior Publication Data

US 2003/0210634 A1    Nov. 13, 2003

(30) Foreign Application Priority Data

Apr. 15, 2002    (JP) ............................. 2002-112544

(51) Int. Cl.
    G11B 7/00    (2006.01)
(52) U.S. Cl. ................ 369/59.12; 369/59.2; 369/59.22
(58) Field of Classification Search ............. 369/59.12, 369/59.2, 59.22, 59.23, 59.24, 109.02
    See application file for complete search history.

(56) References Cited

U.S. PATENT DOCUMENTS

| | | | |
|---|---|---|---|
| 5,220,556 A | 6/1993 | Shimizu | |
| 5,344,683 A | 9/1994 | Shimizu | |
| 5,638,354 A | 6/1997 | Nakayama et al. | |
| 5,737,307 A | 4/1998 | Shimizu | |
| 5,812,520 A | 9/1998 | Nakayama et al. | |
| 5,822,286 A | 10/1998 | Nakayama et al. | |
| 5,926,446 A | 7/1999 | Shimizu | |
| 6,127,100 A | 10/2000 | Shimizu | |
| 6,487,149 B1 | 11/2002 | Yokoi et al. | |
| 6,693,873 B1 * | 2/2004 | Kondo et al. | ............. 369/275.4 |
| 2001/0038592 A1 * | 11/2001 | Kobayashi | ................ 369/59.23 |
| 2002/0021643 A1 | 2/2002 | Miura et al. | |
| 2002/0036978 A1 | 3/2002 | Shimizu | |
| 2002/0071380 A1 | 6/2002 | Shimizu et al. | |
| 2003/0030719 A1 | 2/2003 | Shimizu | |
| 2003/0110444 A1 | 6/2003 | Sakagami et al. | |
| 2003/0112667 A1 | 6/2003 | Shimizu et al. | |
| 2003/0218955 A1 * | 11/2003 | Isshiki et al. | ............ 369/59.21 |

FOREIGN PATENT DOCUMENTS

JP    2-312018    12/1990

* cited by examiner

Primary Examiner—Hoa T. Nguyen
Assistant Examiner—Van Pham
(74) Attorney, Agent, or Firm—Dickstein Shapiro Morin & Oshinsky LLP

(57) ABSTRACT

A multi-value data recording and reproducing device is provided that can accurately eliminate interference among codes through waveform equalization when reproducing information from a reproduction signal having levels multi-valued through modulation of the areas of recording marks on an optical information recording medium. This multi-value data recording and reproducing device is embodied by a multi-value data detecting circuit that varies the sizes of the recording marks in accordance with multi-value data (0, 1, 2, ..., (m−1): m being an integer of 3 or greater) on the optical information recording medium, and detects the multi-value data through predetermined signal processing on signals obtained by scanning the recording marks with an optical spot. This multi-value data detecting circuit includes: a predictor that predictively determines the multi-value data; a delay unit that delays the predetermined signal processing by the period of time required for the predictive determination by the predictor; and a determiner that determines the multi-value data through waveform equalization based on predictive data that are the predictive determination results from the predictor.

26 Claims, 19 Drawing Sheets

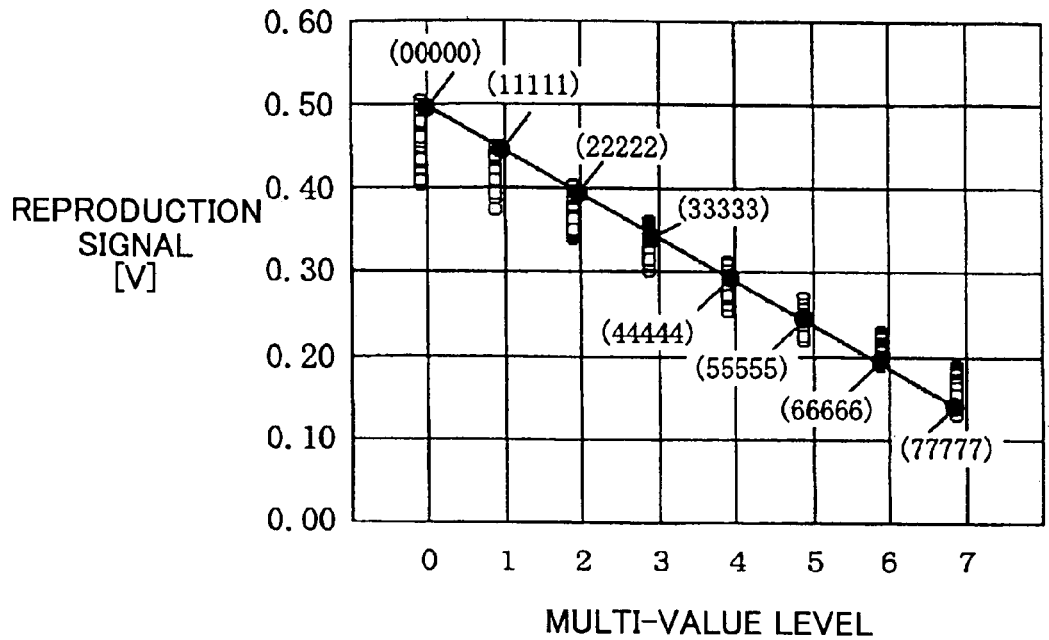
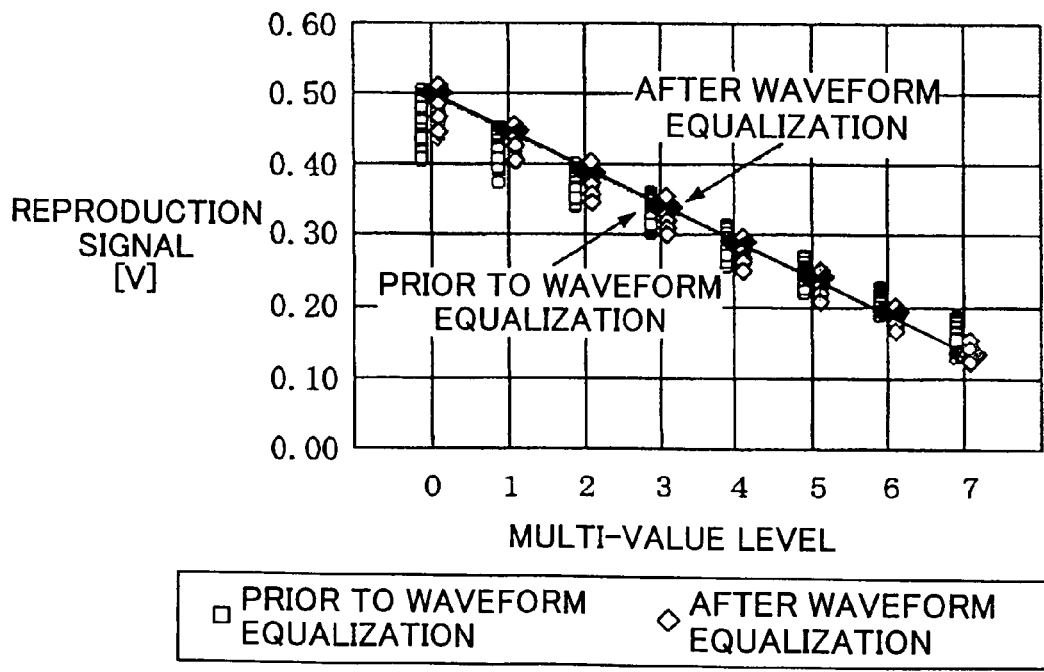

FIG.9

| x | y | z | C0 (x, y, z) | C1 (x, y, z) | C2 (x, y, z) | C3 (x, y, z) |
|---|---|---|---|---|---|---|
| 0 | 0 | 0 | a1 | b1 | c1 | d1 |
| 0 | 0 | 1 | a2 | b2 | c2 | d2 |
| 0 | 0 | 2 | a3 | b3 | c3 | d3 |
| 0 | 0 | 3 | a4 | b4 | c4 | d4 |
| 0 | 0 | 4 | a5 | b5 | c5 | d5 |
| 0 | 0 | 5 | a6 | b6 | c6 | d6 |
| 0 | 0 | 6 | a7 | b7 | c7 | d7 |
| 0 | 0 | 7 | a8 | b8 | c8 | d8 |
| 0 | 1 | 0 | a9 | b9 | c9 | d9 |
| 0 | 1 | 1 | a10 | b10 | c10 | d10 |
| . | . | . | . | . | . | . |
| . | . | . | . | . | . | . |
| . | . | . | . | . | . | . |
| 7 | 7 | 4 | a509 | b509 | c509 | d509 |
| 7 | 7 | 5 | a510 | b510 | c510 | d510 |
| 7 | 7 | 6 | a511 | b511 | c511 | d511 |
| 7 | 7 | 7 | a512 | b512 | c512 | d512 |

FIG.15

| x | z | C0 (x, y, z) | C1 (x, y, z) | C2 (x, y, z) | C3 (x, y, z) |
|---|---|---|---|---|---|
| 0 | 0 | a1' | b1' | c1' | d1' |
| 0 | 1 | a2' | b2' | c2' | d2' |
| 0 | 2 | a3' | b3' | c3' | d3' |
| 0 | 3 | a4' | b4' | c4' | d4' |
| 0 | 4 | a5' | b5' | c5' | d5' |
| 0 | 5 | a6' | b6' | c6' | d6' |
| 0 | 6 | a7' | b7' | c7' | d7' |
| 0 | 7 | a8' | b8' | c8' | d8' |
| 0 | 0 | a9' | b9' | c9' | d9' |
| 0 | 1 | a10' | b10' | c10' | d10' |
| . | . | . | . | . | . |
| . | . | . | . | . | . |
| . | . | . | . | . | . |
| 7 | 4 | a61' | b61' | c61' | d61' |
| 7 | 5 | a62' | b62' | c62' | d62' |
| 7 | 6 | a63' | b63' | c63' | d63' |
| 7 | 7 | a64' | b64' | c64' | d64' | a1' = (a1+a2+a3+a4+a5+a6+a7+a8)/8

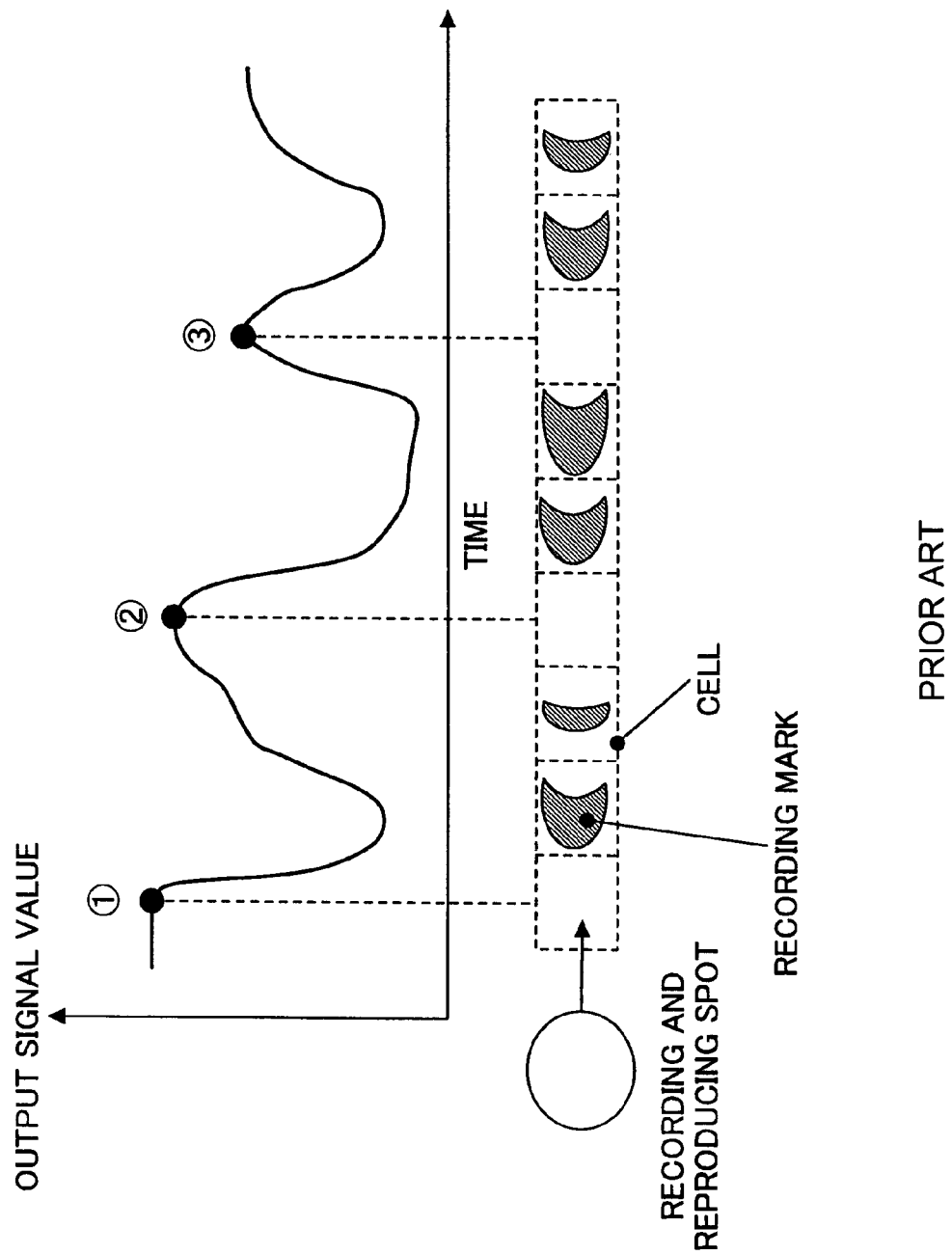

SOLITARY WAVE

PRIOR ART

PRIOR ART

PATTERN EXAMPLE

PRIOR ART

MULTI-VALUE DATA RECORDING AND REPRODUCING DEVICE

BACKGROUND OF THE INVENTION

1. Field of the Invention

The present invention relates to a multi-value data recording and reproducing device such as an optical disk device that can be effectively utilized for recording and reproducing multi-value data on a recording medium such as an optical disk.

2. Description of the Related Art

A conventional optical recording and reproducing system is an optical disk system that uses a laser as a light source and performs recording and reproduction with bit strings, and includes a recording system and a reproducing system that are regarded as partial-response digital transmission paths. The recording system includes a modulating encoder that modulates original data to binary data, a recording equalizer that produces binary intermediate data to restrict error transmission between the recording system and the reproducing system, and a semiconductor laser driving circuit. The reproducing system includes a read amplifier, a waveform equalizer that distinguishes the binary intermediate data from multi-value signals read in synchronization with the recording equalizer, an equalizer controlling device that controls the tap coefficient of the waveform equalizer so as to automatically optimize the characteristics of the waveform equalizer, and a demodulating encoder that reproduces the original data from the distinguished binary intermediate data. Japanese Laid-Open Patent Application No. 2-312018 discloses an example of the above optical recording and reproducing system that records and reproduces multi-value signals.

In such an optical recording and reproducing system, the recording equalizer can be formed by a modulo adder circuit, and the waveform equalizer can be formed by a modulo adder circuit and a multi-value level determining system that has a tap variable in accordance with the equalizer controlling device. The multi-level determining system of the waveform equalizer can be formed by a reproducing waveform equalizing filter having a variable tap system, and a multi-value level identifier.

Also, information recording methods have been suggested to record multi-value information on the information tracks of an optical information recording medium. In those methods, the-recording of the multi-value information is performed through various combinations of the lengths of information pits in the tracking direction and the shifting amounts of the information pits with respect to the reproducing optical spot in the tracking direction. Further, information reproducing devices in compliance with the methods have been suggested. Each of those information reproducing devices includes a multi-division photodetector, a storage unit, and an information identifier. In such an information reproducing device, the multi-division photodetector detects reproducing light flux reflected from an optical information recording medium or penetrated through an optical information recording medium. The storage unit stores all the light quantities and light distributions corresponding to the information pits of multi-value information represented by the combinations of the lengths of predetermined information pits in the tracking direction and the locations of the predetermined information pits with respect to the reproducing optical spot. The information identifier identifies the information of each information pit through correlations between the light quantities and light distributions stored in the storage unit. Japanese Laid-Open Patent Application No. 5-128530 discloses an example of the above type of information reproducing device.

However, there are several problems with the above optical recording and reproducing system, the above information recording method, and the above information reproducing device.

The above optical recording and reproducing system utilizes a multi-value level determining system and a modulo adder circuit as a waveform equalizer. As shown in FIG. 17, the multi-value level determining system and the modulo adder circuit have taps variable in accordance with the equalizer controlling device, so that interference among codes can be eliminated and information can be reproduced with high precision. In this circuit structure, waveform equalization is performed as a linear operation (a linear function) on input signals.

FIG. 18 illustrates an example of a multi-value recording operation in which the area occupancy rates of recording marks are varied with respect to the unit areas called "cells". This operation will be hereinafter referred to as the "area modulation".

With each recording mark, the reflectance becomes lower than the reflectance in unrecorded areas (i.e., "High-to-Low recording"). As shown in FIG. 18, the signal output values (prior to waveform equalization) of a reproducing signal in areas in which recording marks do not exist in the cells are indicated by marks ● numbered ①, ②, and ③. Even if the occupancy rates of the recording marks in the cells are the same, there are differences among the signal output values due to the difference between the occupancy rates of each neighboring recording marks, as indicated by ①, ②, and ③. This is because the relationship between the diameter DM of the recording and reproducing spot and the cell length (the period of time during which the recording and reproducing spot performs scanning in the direction of the arrow shown in FIG. 18) is DM>CL. Thus, the differences among the signal output values can be regarded as interference among codes.

Referring now to FIGS. 19A through 21B, the relationship between the interference among codes and the occupancy rates of each neighboring recording marks will be described.

FIGS. 19A and 19B illustrate a situation in which recording has not been performed in the cells located in front of and behind a subject cell (this situation will be hereinafter referred to as the "solitary wave" situation). FIGS. 20A and 20B illustrate a situation in which the cells located in front of and behind the subject cell each has the same recording mark occupancy rate as the recording mark occupancy rate of the subject cell (this situation will be hereinafter referred to as the "continuous wave" situation). FIGS. 21A and 21B illustrate a situation in which both of the cells located in front of and behind the subject cell have the highest recording mark occupancy rate.

The multi-value levels (0 through 7) in the graphs of FIGS. 19A, 20A, and 21A, indicate the recording mark occupancy rates. More specifically, the multi-value level "0" indicates an unrecorded state of a cell, and the multi-value level "7" indicates the state of a cell having the highest recording mark occupancy rate. Here, the multi-value recording is octal recording. Also, each of the graphs has ● marks representing the values measured prior to a waveform equalizing operation, and has a solid line representing target values. Each of the target values is a calculated value that represents a situation in which waveform interference can be completely eliminated when a waveform equalizing operation is performed with the circuit shown in FIG. 17.

As shown in FIG. 19A, the difference between the measured values and the target values exhibits a linearly proportional relationship (a linear relationship) with respect to the respective multi-value levels, and can be corrected by altering equalizing coefficients (equivalent to the constants C0 through C4 in FIG. 17) for linear operations through waveform equalization.

As for FIG. 20A, the measured values are substantially the same as the target values, and thus, interference among codes can be eliminated through waveform equalization.

On the other hand, as shown in FIG. 21A, the difference between the measured values and the target values is large in the area of the multi-levels 0 through 2, and does not exhibit a linearly proportional relationship with respect to the multi-value levels. This proves that waveform interference cannot be completely eliminated by the circuit shown in FIG. 17. As described above, in a case where waveform interference contains components that do not have linear influence (for example, a case of the multi-value recording by the "area modulation" technique described with reference to FIG. 18), there is a problem that interference cannot be adequately eliminated by waveform equalization.

To solve the problem that interference cannot be completely eliminated by waveform equalization by the above information recording method and the information reproducing device in a case where the interference among codes contains components having no linear influence (for example, the multi-value recording by the "area modulation" described with reference to FIG. 18), the influence of waveform interference is learned in advance through all the combination patterns, correction is added to the waveform equalizing operation, and a neural network that imitates the human information processing mechanism is utilized as a means of minimizing each waveform equalizing error in the learning process.

However, a considerable period of time is required for determining the convergence conditions for minimizing the error with each recording mark. As a result, in a case where an unknown data area is reproduced by reproducing a learning area inserted in a data area, the data reproducing speed cannot be increased though the reliability in data reproduction can be increased.

SUMMARY OF THE INVENTION

A general object of the present invention is to provide a multi-value data recording and reproducing device and method in which the above disadvantages are eliminated.

A more specific object of the present invention is to provide a multi-value data recording and reproducing device that can accurately eliminate interference among codes through a waveform equalizing operation when reproducing information from reproduction signals having multi-valued levels. The multi-value data recording and reproducing device modulates the areas of recording marks on an optical information recording medium to reproduce the multi-value information.

The above objects of the present invention are achieved by a multi-value data recording and reproducing device that varies the sizes of recording marks in accordance with multi-value (0, 1, 2, . . . (m−1): m being an integer of 3 or greater) data on an optical information recording medium, and detects the multi-value data through predetermined signal processing on signals obtained by scanning the recording marks with an optical spot. This multi-value data recording and reproducing device includes: a predictor that predictively determines the multi-value data; a delay unit that delays the predetermined signal processing by the period of time required for the predictive determination by the predictor; and a determiner that determines the multi-value data through waveform equalization based on predictive data that are the prediction results from the predictor.

This multi-value data recording and reproducing device may further include a waveform equalizing coefficient learning unit that reproduces an area on the optical information recording medium in which known multi-value data are prerecorded, determines such a predictive waveform equalizing coefficient that the signal output of each item of the multi-value data subjected to signal processing by a predictive waveform equalizing circuit has the smallest possible error with respect to a target value, and also determines such a detective waveform equalizing coefficient that the signal output of each item of the multi-value data subjected to signal processing by a detective waveform equalizing circuit has the smallest possible error with respect to a target value. Here, the detective waveform equalizing coefficient is determined for each combination pattern of three or more sequential recording marks including a known data value of a recording mark string that precedes a subject recording mark, a known data value of the subject recording mark, and a known data value of a recording mark string that follows the subject recording mark.

This multi-value data recording and reproducing device may further include a multi-value data detecting threshold value learning unit that determines a predictive threshold value that is -a multi-value data detecting threshold value used for predicting the multi-value data based on the signal output of each item of the multi-value data subjected to the waveform equalization with the predictive waveform equalizing coefficient, and determines a detective threshold value that is a multi-value detecting threshold value for ultimately detecting the multi-value data based on the signal output of each item of the multi-value data subjected to the waveform equalization with the detective waveform equalizing coefficient.

This multi-value data recording and reproducing device may further include an ultimate decision unit that, when reproducing unknown multi-value recording data on the optical information recording medium through signal processing based on the predictive waveform equalizing coefficient, the detective waveform equalizing coefficient, the predictive threshold value, and the detective threshold value, predictively determines the multi-value data after performing waveform equalization with a prediction-only waveform equalizing circuit, performs waveform equalization under equalizing conditions set in accordance with combination patterns predicted by the detective waveform equalizing circuit with reference to the combination patterns of three or more sequential recording marks including a predictive value of the recording mark string that precedes the subject recording mark, a predictive value of the subject recording mark, and a predictive value of the recording mark string that follows the subject recording mark, and ultimately detects the multi-value data from reproduction signals subjected to signal processing through the waveform equalization. Here, the predictive values are included in the predictive data obtained through the predictive determination of the multi-value data.

In this multi-value data recording and reproducing device, the target value of the signal output of each item of the multi-value data may be a signal output value that can be obtained by reproducing three or more sequential recording mark strings containing the same multi-value data prior to the waveform equalization.

In this multi-value data recording and reproducing device, the predictive waveform equalizing circuit may be a modulo adder circuit that includes three or more taps. Here, the modulo adder circuit is formed by a circuit that operates based on the following equation:

$$EQ(n) = D(n) + \sum_i \{D(n) - D(n-i)\} \times Cj$$

where a waveform equalizing operation is performed on a signal output from the nth recording mark, $D(n)$ represents a signal output prior to the waveform equalizing operation performed on the nth recording mark, i and j vary with the number of taps, $Cj$ represents the predictive waveform equalizing coefficient, and $EQ(n)$ represents a signal output after the waveform equalizing operation.

In this multi-value data recording and reproducing device, the detective waveform equalizing circuit may be a modulo adder circuit that includes three or more taps. Here, the modulo adder circuit is formed by a circuit that operates based on the following equation:

$$EQ'(n) = D'(n) + \sum_i \{D'(n) - D'(n-i)\} \times Cj'$$

where a waveform equalizing operation is performed on a signal output from the nth recording mark, $D'(n)$ represents a signal output after an initial waveform equalizing operation performed on the nth recording mark, i and j vary with the number of taps, $Cj'$ represents the detective waveform equalizing coefficient, and $EQ'(n)$ represents a signal output after a late waveform equalizing operation.

In this multi-value data recording and reproducing device, the prerecorded known multi-value data string may be formed by a multi-value data string in which a data string including all the combinations of three or more sequential items of multi-value data is repeatedly recorded, and the optical information recording medium may have a recording area that is separate from a data area in which unknown multi-value data are recorded. Here, the recording area is periodically formed on the optical information recording medium, and recording and reproduction are performed in the recording area.

In this multi-value data recording and reproducing device, the prerecorded known multi-value data may be formed by a data string including all the combinations of three or more sequential items of multi-value data, and a data string in which a pattern of three or more sequential recording mark strings including multi-value data having the same target value of the signal output of each item of recording data is repeatedly recorded. Here, the optical information recording medium has a recording area that is separate from a data area in which unknown multi-value data are recorded. The recording area is periodically formed on the optical information recording medium, and recording and reproduction are performed in the recording area.

In this multi-value data recording and reproducing device, the detective waveform equalizing coefficient $Cj'$ may be determined from $\delta(n)$ of the following equation:

$$Cj' = Cj - \delta(n) \times Sj \times \{D(n) - D(n-i)\} \times G$$

where $\delta(n)$ represents the error between the target value and a reproduction signal after a predictive waveform equalizing operation performed on the nth recording mark, $Cj$ represents the predictive waveform equalizing coefficient, G represents a convergence gain, Sj is equal to $Cj/\Sigma|Cj|$ ($|Cj|$ being the absolute value of $Cj$), and the error generated from the term $\{D(n) - D(n-i)\}$ varies with the proportion of the equalizing coefficient of $Cj$.

In this multi-value data recording and reproducing device, the convergence gain G may be determined so that the error between the target value and each signal output after a detective waveform equalizing operation is minimized.

In this multi-value data recording and reproducing device, an initial value of the predictive waveform equalizing coefficient may be prerecorded as system information on the optical information recording medium.

In this multi-value data recording and reproducing device, the initial value of the predictive waveform equalizing coefficient prerecorded on the optical information recording medium may be recorded as multi-value recording data having a smaller number of values than the number of values in the multi-value data recorded in the data area.

In this multi-value data recording and reproducing device, the initial value of the predictive waveform equalizing coefficient prerecorded on the optical information recording medium and the area in which the known multi-value data are prerecorded may be reproduced, and the predictive equalizing coefficient is then determined so that the error between the target value and the signal output of each item of the multi-value data is minimized.

The above objects of the present invention are also achieved by a multi-value data recording and reproducing device that varies the sizes of recording marks in accordance with multi-value $(0, 1, 2, \ldots, (m-1)$: m being an integer of 3 or greater) data on an optical information recording medium, and detects the multi-value data through predetermined signal processing on signals obtained by scanning the recording marks with an optical spot. This multi-value data recording and reproducing device includes: a predictor that predictively determines the multi-value data; a delay unit that delays the predetermined signal processing by the period of time required for the predictive determination by the predictor; and a determiner that determines the multi-value data through waveform equalization based on predictive data that are the prediction results from the predictor. Here, the combination of the delay unit and the determiner is repeatedly arranged in series, so that the waveform equalization is repeated until the determination results of the multi-value data converge, with the determination results from the determiner being used as predictive data.

This multi-value data recording and reproducing device may further include a detective waveform equalizing coefficient learning unit that reproduces an area on the optical information recording medium in which known multi-value data are prerecorded, determines such a predictive waveform equalizing coefficient that the signal output of each item of the multi-value data subjected to signal processing by a predictive waveform equalizing circuit has the smallest possible error with respect to a target value, and also determines such a detective waveform equalizing coefficient that the signal output of each item of the multi-value data subjected to signal processing by a detective waveform equalizing circuit has the smallest possible error with respect to a target value. Here, the detective waveform equalizing coefficient is determined for each combination pattern of three or more sequential recording marks including the combination of a known data value of a recording mark string that precedes a subject recording mark and a known data value of a recording mark string that follows the subject recording mark, but excluding any known data value of the recording mark to be reproduced.

This multi-value data recording and reproducing device may further include a multi-value data detecting threshold value learning unit that determines a predictive threshold value that is a multi-value data detecting threshold value used for predicting the multi-value data based on the signal output of each item of the multi-value data subjected to the waveform equalization with the predictive waveform equalizing coefficient, and determines a detective threshold value that is a multi-value detecting threshold value used for ultimately detecting the multi-value data based on the signal output of each item of the multi-value data subjected to the waveform equalization with the detective waveform equalizing coefficient. Here, the determination of the detective threshold value is based on a signal output value that has been only once subjected to signal processing by the detective waveform equalizing circuit.

This multi-value data recording and reproducing device may further include a repetitive processing unit that, when reproducing unknown multi-value recording data from the optical information recording medium through signal processing based on the predictive waveform equalizing coefficient, the detective waveform equalizing coefficient, the predictive threshold value, and the detective threshold value, predictively determines the multi-value data after a waveform equalizing operation by a prediction-only waveform equalizing circuit, performs waveform equalization under equalizing conditions that are set in accordance with each combination pattern predicted by the detective waveform equalizing circuit with reference to combination patterns of three or more sequential recording marks including a predictive value of the recording mark string that precedes the subject recording mark and a predictive value of the recording mark string that follows the subject recording mark, but excluding any known data value of the subject recording mark to be reproduced among the predictive data obtained through the predictive determination, detects the multi-value data using a reproduction signal subjected to signal processing through the waveform equalization, performs multi-value determination on the multi-value data, and repeats the waveform equalization using the determination results of the multi-value as predictive data until the determination results of the multi-value data converge.

In this multi-value data recording and reproducing device, the target value of the signal output of each item of the multi-value data may be a signal output value that can be obtained by reproducing three or more sequential recording mark strings containing the same multi-value data prior to the waveform equalization.

In this multi-value data recording and reproducing device, the predictive waveform equalizing circuit may be a modulo adder circuit that includes three or more taps. Here, the modulo adder circuit is formed by a circuit that operates based on the following equation:

$$EQ(n) = D(n) + \sum_i \{D(n) - D(n-i)\} \times Cj$$

where a waveform equalizing operation is performed on a signal output of the nth recording mark, $D(n)$ represents a signal output prior to the waveform equalizing operation performed on the nth recording mark, i and j vary with the number of taps, $Cj$ represents the predictive waveform equalizing coefficient, and $EQ(n)$ represents a signal output after the waveform equalizing operation.

In this multi-value data recording and reproducing device, the detective waveform equalizing circuit may be a modulo adder circuit that includes three or more taps. Here, the modulo adder circuit is formed by a circuit that operates based on the following equation:

$$EQ'(n) = D'(n) + \sum_i \{D'(n) - D'(n-i)\} \times Cj'$$

where a waveform equalizing operation is performed on a signal output of the nth recording mark, $D'(n)$ represents a signal output after an initial waveform equalizing operation performed on the nth recording mark, i and j vary with the number of taps, $Cj'$ represents the detective waveform equalizing coefficient, and $EQ'(n)$ represents a signal output after a late waveform equalizing operation.

In this multi-value data recording and reproducing device, the prerecorded known multi-value data string may be formed by a multi-value data string in which a data string including all the combinations of three or more sequential items of multi-value data is repeatedly recorded, and the optical information recording medium may have a recording area that is separate from a data area in which unknown multi-value data are recorded. Here, the recording area is periodically formed on the optical information recording medium, and recording and reproduction are performed in the recording area. When the multi-value data to be reproduced are determined, learning information is updated through a statistical-operation in which the latest learning results are added to the learning results already recorded and reproduced.

In this multi-value data recording and reproducing device, the prerecorded known multi-value data may be formed by a data string containing all the combinations of three or more sequential items of multi-value data, and a data string in which a pattern of three or more sequential recording mark strings including multi-value data having the same target value of the signal output of each item of recording data is repeated recorded. Here, the optical information recording medium has a recording area that is separate from a data area in which unknown multi-value data are recorded. The recording area is periodically formed on the optical information recording medium, and recording and reproduction are performed in the recording area. When the multi-value data to be reproduced are determined, learning information is updated through a statistical operation in which the latest learning results are added to the learning results already recorded and reproduced.

In this multi-value data recording and reproducing device, the detective waveform equalizing coefficient $Cj'$ may be determined from $\delta(n)$ of the following equation:

$$Cj' = Ci - \delta(n) \times Sj \times \{D(n) - D(n-i)\} \times G$$

where $\delta(n)$ represents the error between the target value and a reproduction signal after a predictive waveform equalizing operation performed on the nth recording mark, $Cj$ represents the predictive waveform equalizing coefficient, G represents a convergence gain, $Sj$ is equal to $Cj/\Sigma|Cj|$ ($|Cj|$ being the absolute value of $Cj$), and the error generated from the term $\{D(n)-D(n-i)\}$ varies with the proportion of the equalizing coefficient of $Cj$.

In this multi-value data recording and reproducing device, the convergence gain G may be determined so that the error between the target value and each signal output after a detective waveform equalizing operation is minimized.

In this multi-value data recording and reproducing device, an initial value of the predictive waveform equalizing coefficient may be prerecorded as system information on the optical information recording medium.

In this multi-value data recording and reproducing device, the initial value of the predictive waveform equalizing coefficient prerecorded on the optical information recording medium may be recorded as multi-value recording data having a smaller number of values than the number of values in the multi-value data recorded in the data area.

In this multi-value data recording and reproducing device, the initial value of the predictive waveform equalizing coefficient prerecorded on the optical information recording medium and the area in which the known multi-value data are prerecorded may be reproduced, and the predictive equalizing coefficient may be determined so that the error between the target value and the signal,output of each item of the multi-value data is minimized.

The above and other objects, features, and advantages of the present invention will become more apparent from the following detailed description taken in conjunction with the accompanying drawings.

BRIEF DESCRIPTION OF THE DRAWINGS

FIG. 2 is a diagram illustrating the convergence state in a case of octal-recording waveform equalization;

FIG. 3 is another diagram illustrating the convergence state in a case of octal-recording waveform equalization;

FIG. 9 shows a list of equalizing coefficients used in the detective waveform equalization by the multi-value data detecting circuit shown in FIG. 1;

FIG. 15 shows a list of the equalizing coefficients used in the multi-value data detecting circuit shown in FIG. 14;

FIG. 18 illustrates an example of multi-value recording realized by varying the area occupancy rates of recording marks with respect to the unit areas called "cells";

DESCRIPTION OF THE PREFERRED EMBODIMENTS

Figure 1:
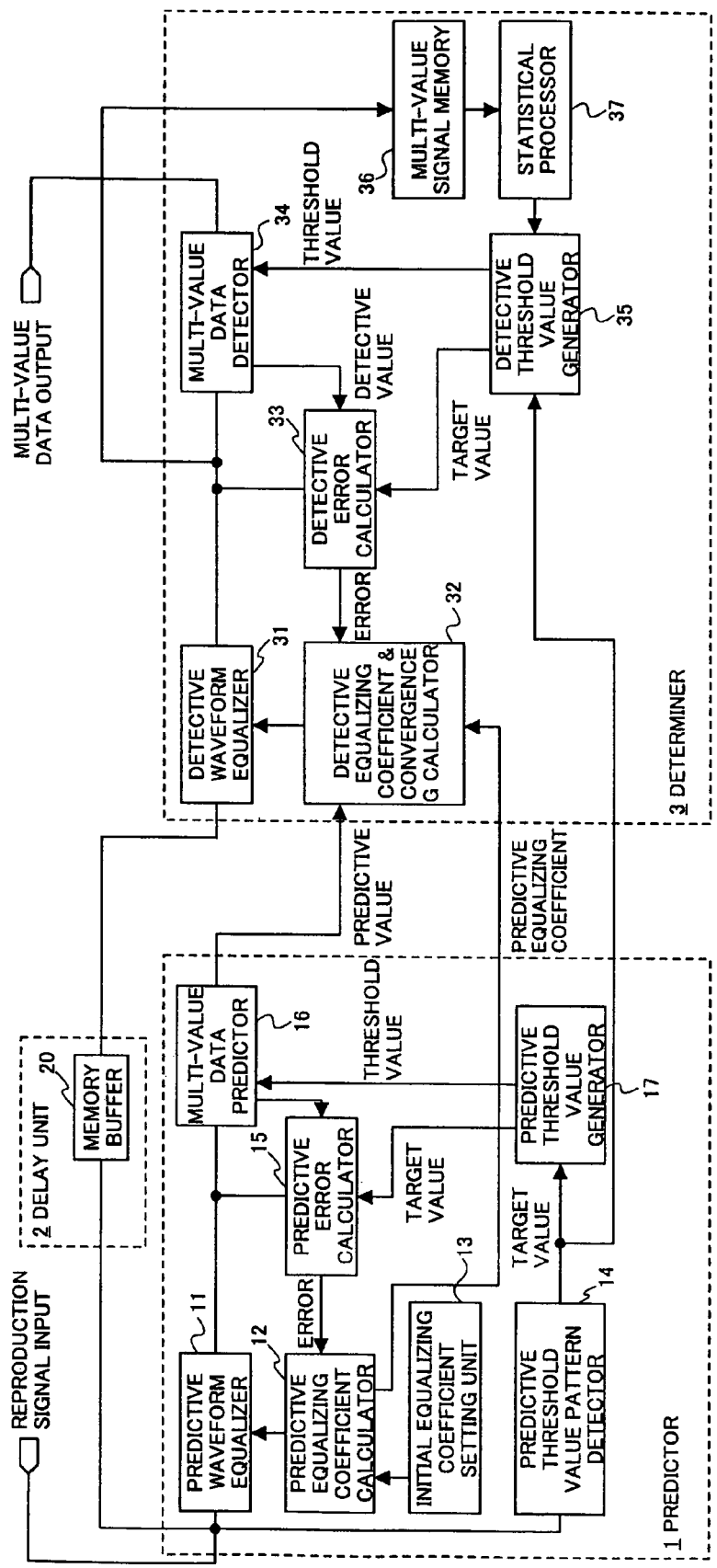
FIG. 1 illustrates the structure of a multi-value data detecting circuit that is an embodiment of the multi-value data recording and reproducing device in accordance with the present invention.

The following is a description of embodiments of the present invention, with reference to the accompanying drawings.

As described in the description of the related art, a conventional waveform equalizing operation cannot,adequately eliminate waveform interference through waveform equalization in a case where the waveform interference contains components that do not have linear influence (the multi-value recording by the "area modulation" technique shown in FIG. 18). As described with reference to FIGS. 19A through 21B, interference among codes exhibits various degrees of influence, depending on the states of the recording marks located in front of and behind the subject recording mark that is an object to be reproduced.

To solve this problem, the detective waveform equalizing operation is repeated in accordance with the states of the recording marks located in front of and behind the subject recording mark, which is an object to be reproduced, and the degrees of influence. To do so, it is necessary to predict multi-value data. However, since the multi-value data from a reproduction signal prior to waveform equalization are somewhat indistinct, it is necessary to perform an operation to increase the accuracy in the data prediction. As the operation to increase the accuracy in the data prediction, a waveform equalizing operation using a fixed equalizing constant is performed on reproduction signals, so that the multi-value data can be accurately predicted from the reproduction signal.

To perform a waveform equalizing operation in accordance with the states and the degree of influence of the recording marks located in front of and behind the subject recording mark that is an object to be reproduced, it is necessary to set equalizing conditions for each of three or more combination patterns including the recording mark string preceding the subject recording mark, the subject recording mark, and the recording mark string following the subject recording mark.

For example, when a recording and reproducing spot is located at the center of the subject recording mark, with the relationship between the diameter BD of the recording and reproducing spot and the cell length CL being approximately BD=2×CL, the recording and reproducing spot lies across the three recording marks. Therefore, it is necessary to optimize the waveform equalizing conditions with reference to the equalizing coefficient used for waveform equalization in each of the three combination patterns from predicted multi-value data, and to perform detective waveform equalization under the optimized waveform equalizing conditions.

The above waveform equalizing conditions may vary with combinations of information recording devices and optical information recording media, in terms of variations of the recording conditions among the optical information recording devices and changes of the recording sensitivity among the recording media.

Therefore, to effectively increase the waveform equalizing performance in accordance with the present invention, it is necessary to reproduce the known multi-value data area in advance, learn the predictive waveform equalizing conditions and the detective waveform equalizing conditions, and then reproduce the unknown multi-value data area based on the learning results.

FIG. 1 illustrates the structure of a multi-value data detecting circuit that is an embodiment of the multi-value data recording and reproducing device in accordance with the present invention.

This multi-value data detecting circuit includes a predictive waveform equalizer 11, a predictor 1 that predicts multi-value data from a reproduction signal subjected to predictive waveform equalization, a detective waveform equalizer 31, and a determiner 3 that predicts multi-value data from a reproduction signal subjected to detective waveform equalization.

With this circuit structure, conditions for waveform equalization are learned, and unknown data are reproduced.

In this circuit structure, an initial equalizing coefficient is recorded in advance on an optical information recording medium so as to achieve higher learning efficiency in the predictive waveform equalization. By doing so, the problem of the long learning time required due to variations of equalizing coefficients among optical information recording media can be eliminated.

Further, to increase the accuracy in prediction results, a convergence target value of waveform equalization is generated from a multi-value recorded reproducing signal. Accordingly, even if the reproducing signal fluctuates with a change such as a reflectance change or a recording sensibility change, it is possible to predict multi-value data fluctuating with the fluctuation of the reproduction signal.

To learn a target value, using the following pattern is effective, considering the characteristics of waveform equalization.

FIGS. 2 and 3 are charts illustrating convergence states in cases where octal recording waveform equalization is performed.

The relationship between the recording and reproducing spot diameter BD and the cell length CL is roughly expressed by the equation: BD=2×CL. As can be seen from FIGS. 2 and 3, the convergent value of each item of multi-value data is a reproduction signal value of a combination pattern of (x, y, z) consisting of (000), (111), (222), (333), (444), (555), (666), and (777), where x represents the multi-value data preceding the subject recording mark, y represents the multi-value data of the subject recording mark, and z represents the multi-value data following the subject recording mark.

Based on the above principles, the target values can be determined simply by reproducing the patterns of multi-value data recorded in the form of the combinations of eight patterns (000) through (777).

In the case of octal recording, the total number of combination patterns of (x, y, z) is $8^3=512$. Accordingly, the target values can be learned from the combinations of only eight patterns, which is very efficient. Here, "0" represents a cell that does not have a recording mark recorded therein, and "7" represents a cell in which the largest recording mark is recorded.

Figure 4:
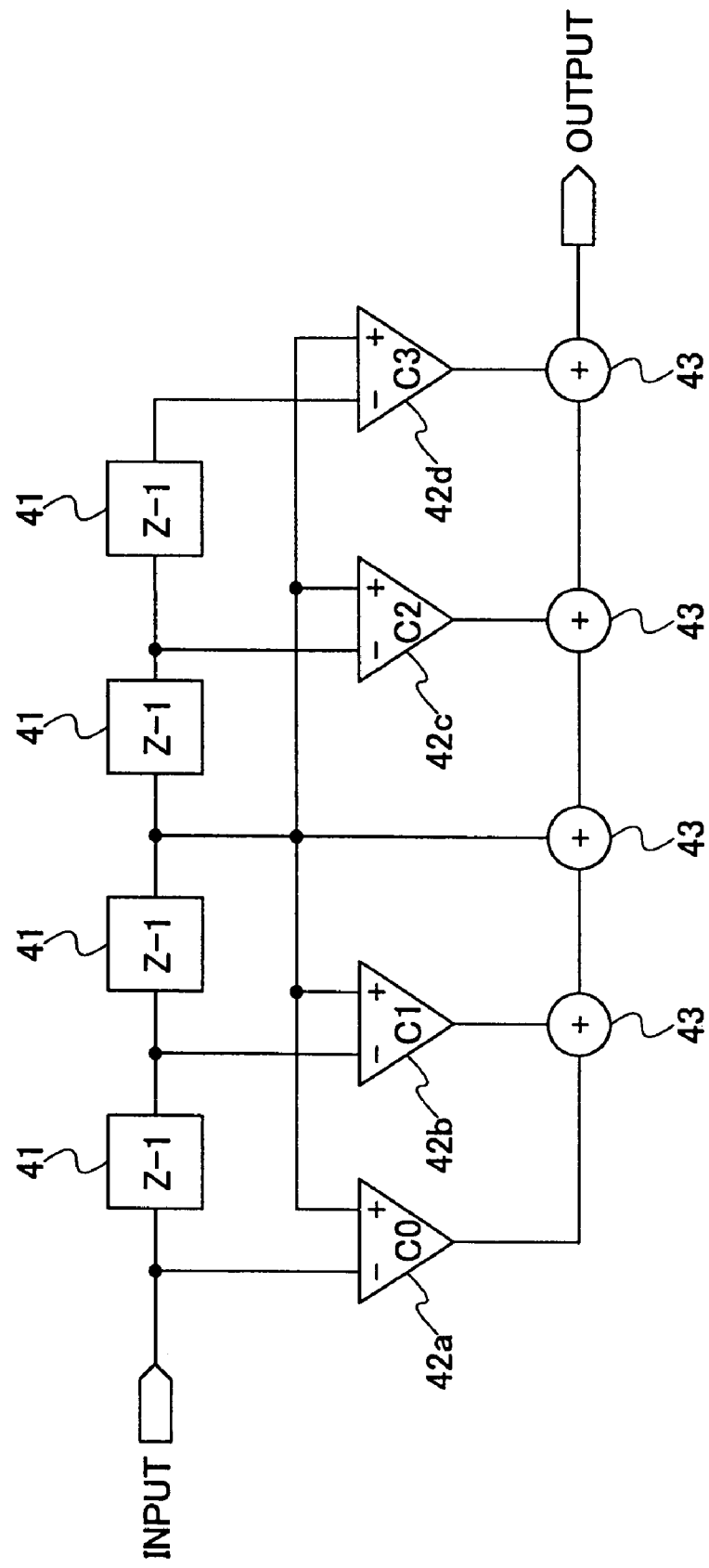
FIG. 4 is a block diagram illustrating the structure of a waveform equalizer in accordance with the present invention.
Figure 17:
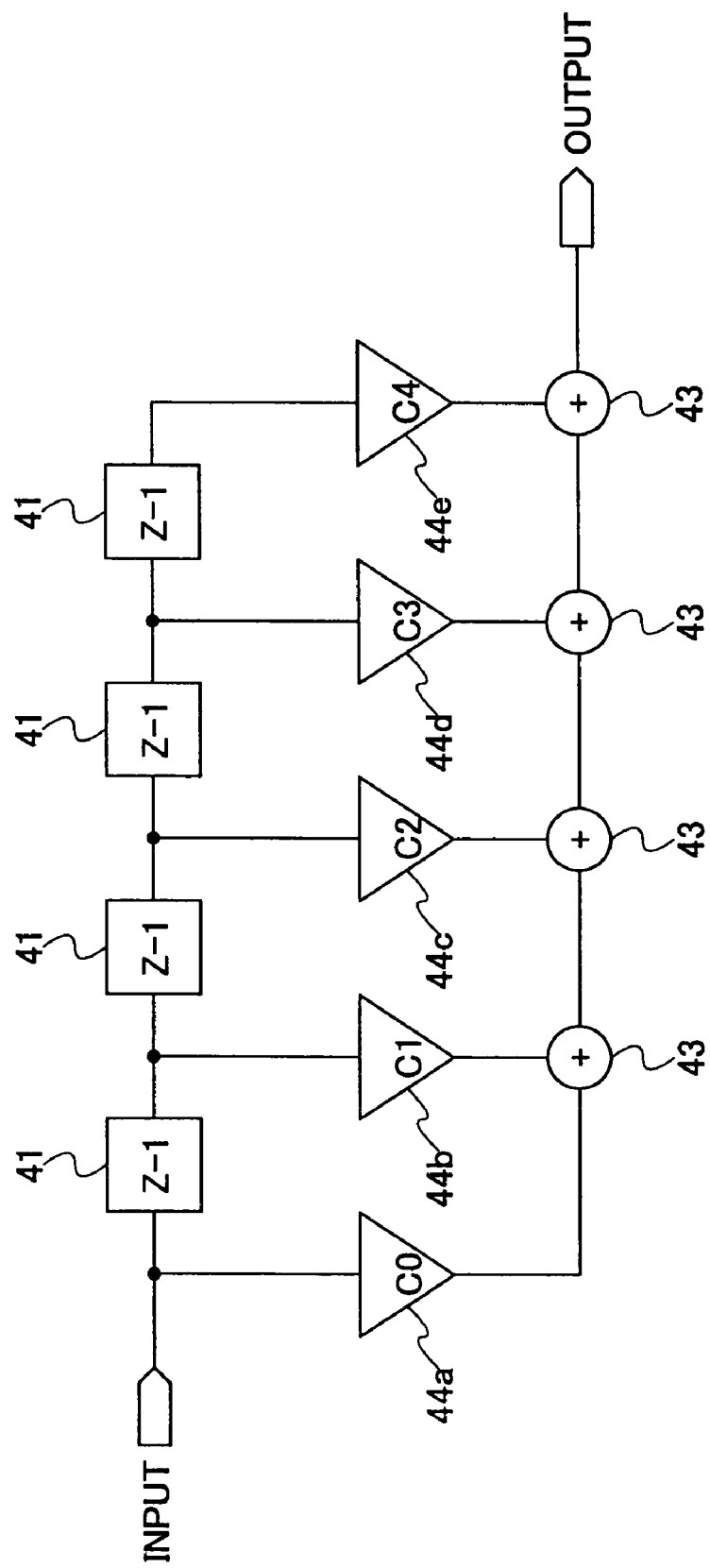
FIG. 17 is a block diagram illustrating the structure of a conventional waveform equalizer.
Figure 19A:
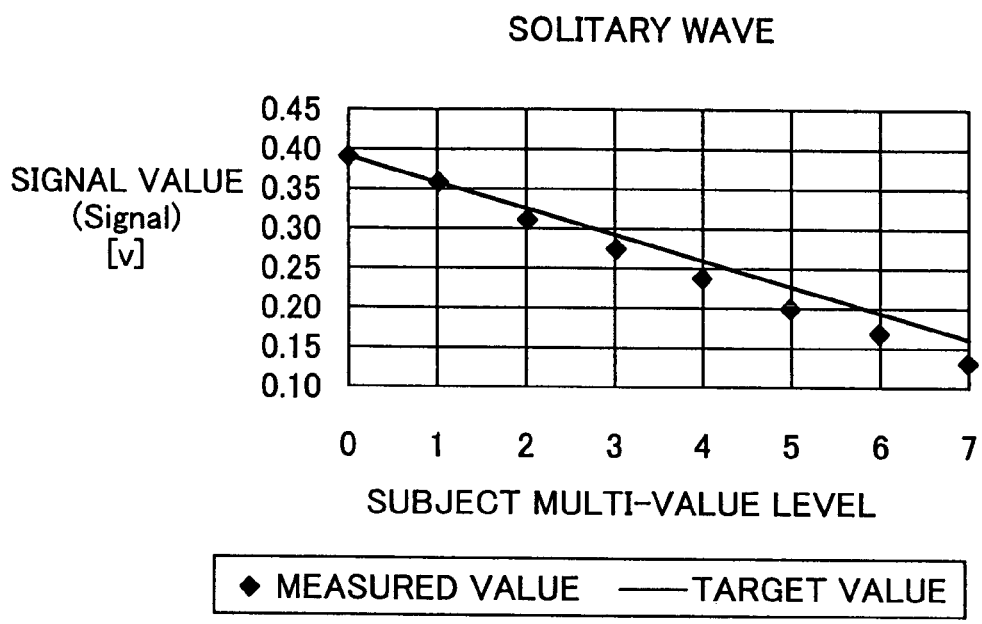
FIGS. 19A and 19B illustrate a situation in which recording has not been performed in the cells located in front of and behind the subject cell.
Figure 19B:
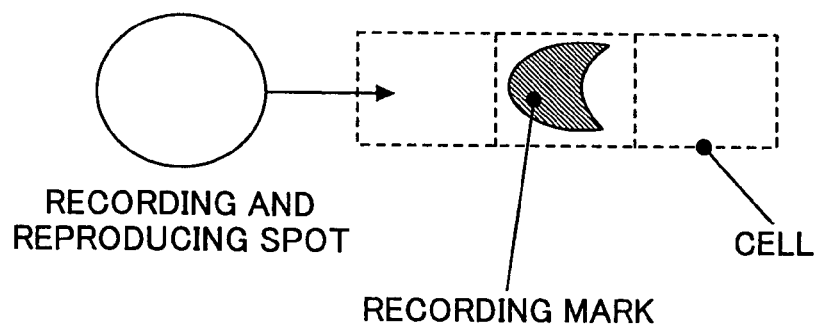
Figure 20A:
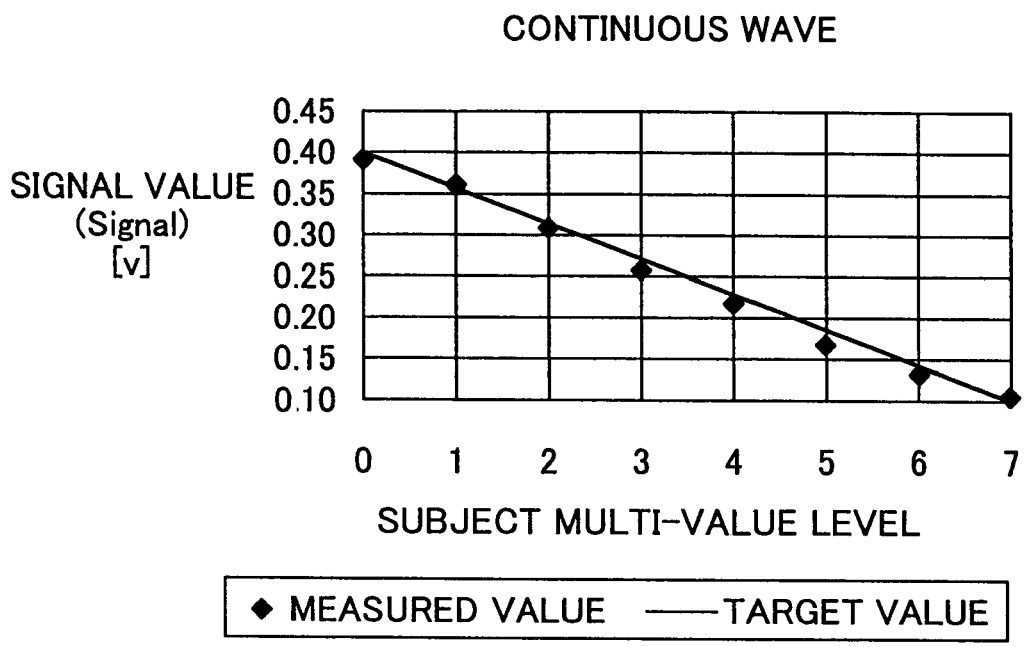
FIGS. 20A and 20B illustrate a situation in which both of the cells located in front of and behind the subject cell have the same recording mark occupancy rate as the recording mark occupancy rate of the subject cell.
Figure 20B:
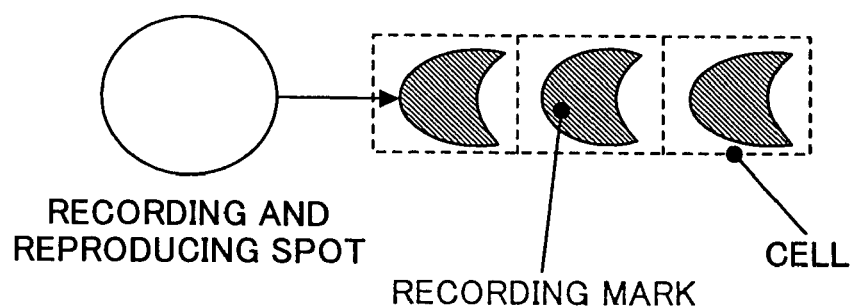
Figure 21A:
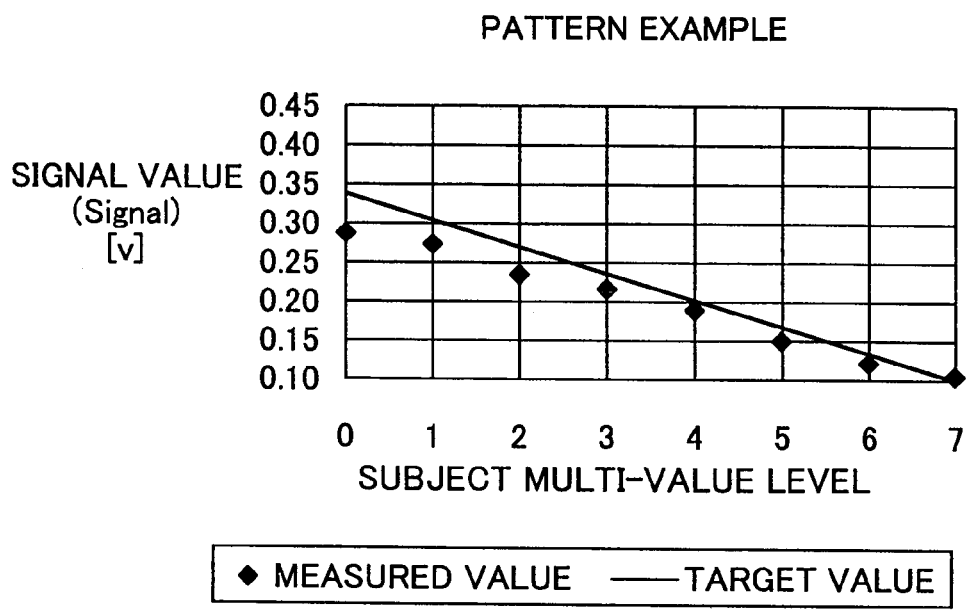
FIGS. 21A and 21B illustrate a situation in which the cells located in front of and behind the subject cell both have the highest recording mark occupancy rate.
Figure 21B:
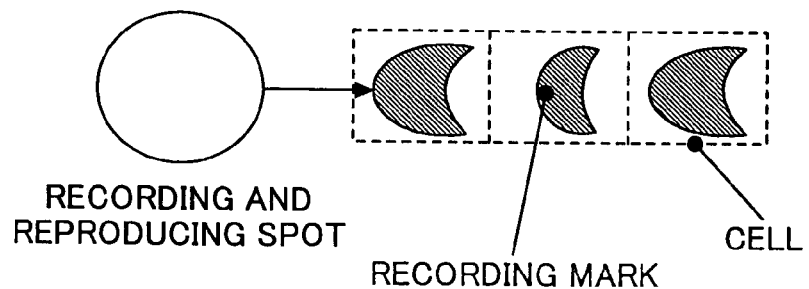

To efficiently converge multi-value data to eight target values, a waveform equalizing circuit shown in FIG. 4 is used instead of the waveform equalizing circuit of the prior art shown in FIG. 17.

The waveform equalizing circuit shown in FIG. 4 has a 5-tap structure. This structure is designed to eliminate waveform interference from the two recording marks preceding the subject recording mark and the two recording marks following the subject recording mark, which amount to four recording marks in total.

As described above, when the recording and reproducing spot is located at the center of the subject recording mark and lies across the three recording marks, the subject recording mark receives interference among codes that is the influence from the two recording marks located in front of and behind the subject recording mark. However, to increase the correction accuracy with a waveform equalizer, a 5-tap structure that can reduce the interference from the recording marks in front of and behind the subject recording mark is more preferable.

In the structure shown in FIG. 4, all the outputs of four difference calculators 42a through 42d are "0", when the five sequential cells have the same multi-value data.

As a result, when the combination of target values (x, y, z) is x=y=z, which is the pattern to learn the target values, all the outputs of the four difference calculators 42a through 42d are "0", regardless of the values of the waveform equalizing coefficients. Accordingly, the structure shown in FIG. 4 serves as a waveform equalizer that converges on the target values.

Also, this waveform equalizing circuit has four equalizing coefficients, which are fewer than the five equalizing coefficients used in the conventional circuit shown in FIG. 17 by one. Accordingly, this structure is more advantageous in that there are fewer calculating steps in learning the equalizing coefficients.

Next, recording and reproduction of a multi-value data signal by an information recording and reproducing circuit that utilizes the multi-value data detecting circuit of FIG. 1 will be described.

Figure 5:
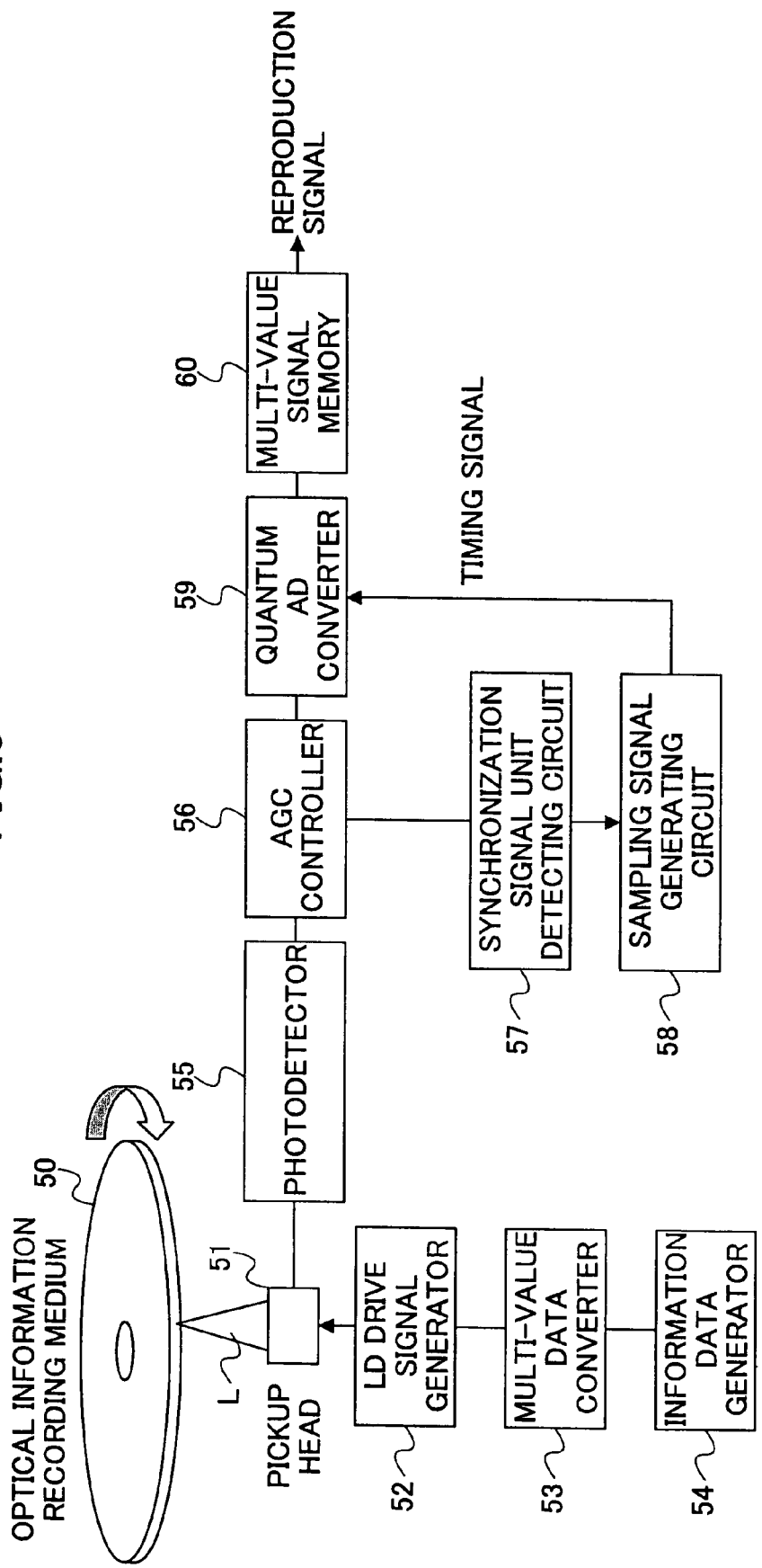
FIG. 5 is a block diagram-illustrating the structure of an information recording and reproducing circuit that utilizes the multi-value data detecting circuit shown in FIG. 1.

FIG. 5 is a block diagram illustrating the structure of the information recording and reproducing circuit that utilizes the multi-value data detecting circuit of FIG. 1. This information recording and reproducing circuit performs data recording and reproduction on an optical information recording medium 50, and includes a pickup head 51, a LD drive signal generator 52, a multi-value data converter 53, an information data generator 54, a photodetector 55, an AGC controller 56, a synchronization signal unit detecting circuit 57, a sampling signal generating circuit 58, a quantum AD converter 59, and a multi-value signal memory 60.

The information data generator 54 generates digital data to be recorded on the optical information recording medium 50, and the multi-value data converter 53 converts the multi-value data into octal values.

If the digital data are "001101010", for example, the multi-value data converter 53 converts each three figures of the digital data into one octal number, and generates octal data "152". Based on the octal data, a recording pulse pattern to be recorded with the LD driver signal generator 52 is generated, and the semiconductor laser light source (LD) of the pickup head 51 is driven so that the pickup head 51 gathers laser beams L onto the optical information recording medium 50 that is rotating. Thus, optical recording is performed on the optical information recording medium 50.

The optical information recording medium 50 may be a CD-R disk on which a pigment material such as a "write once" material is used, or a CD-RW disk on which a rewritable phase-variable material is used.

Figure 6:
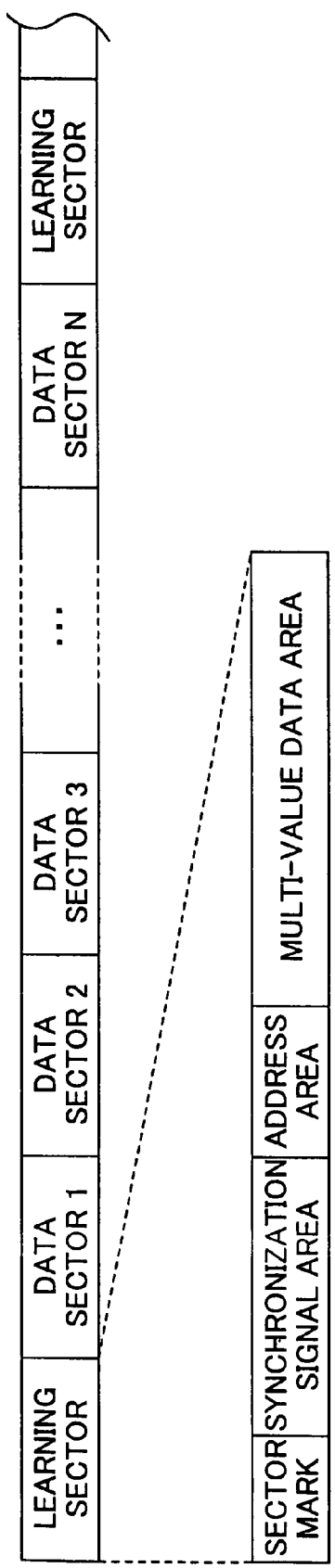
FIG. 6 illustrates the format of recording data recorded on the optical information recording medium shown in FIG. 1.

FIG. 6 illustrates the recording data format of the optical information recording medium 50 shown in FIG. 1.

As shown in FIG. 6, the recording data format of the optical information recording medium 50 includes unit blocks called "sectors" such as "learning sectors" and "data sectors 1 through N". Each of the sectors consists of a sector mark, a synchronization signal area, an address area, and a multi-value data area.

The sector mark indicates the start of a sector, and is formed by a pattern (not shown) that does not appear in the data area, such as "00000000777777".

The synchronization signal area is formed by a repetitive pattern (not shown), such as "0707070707070707 . . . . The repetitive pattern is to be used as a sampling clock when multi-value data are quantized. The address area indicates the address of the sector, and the address is recorded as multi-value data.

To reproduce a signal, laser light is gathered on the optical information recording medium 50 that is rotating, and reflected return light is photoelectrically converted to an electric signal by the photodetector 55. The AGC controller 56 detects a sector mark from the reproduction signal, and further detects the largest signal value "00000000" and the smallest signal value "77777777" of the sector mark. The AGC controller 56 then performs automatic gain control (AGC) so as to stabilize the amplitude (i.e., the difference between the largest signal value and the smallest signal value). The AGC is performed to correct the reproduction signal to prevent an incorrect multi-value determination due to a reflectance variation caused by the optical information recording medium 50.

The synchronization signal unit detecting circuit 57 next detects a synchronization signal area. Based on the synchronization signal, the sampling signal generating circuit 58 generates a timing signal. The quantum AD converter 59 then quantizes (analog-to-digital converts) multi-value signals with the timing signal (to sample-hold the reproduction signal at the center of the cell). The quantized multi-value signals are sequentially recorded in the multi-value signal memory 60. The signals recorded in the multi-value signal memory 60 are sequentially read and input as quantized reproduction signals into the multi-value data detecting circuit shown in FIG. 1. The signals are to be utilized in waveform equalization and multi-value determination.

Next, the process of learning predictive equalizing coefficients in the multi-value data detecting circuit will be described.

The initial-step unit of FIG. 1 (i.e., the predictive waveform equalizer 11 and the multi-value data predictor 16) is used as a circuit structure for predictive waveform equalization. Also, a waveform equalizer having the circuit structure shown in FIG. 4 is employed here.

The waveform equalizer shown in FIG. 4 performs a calculating operation based on the following equation (7):

$$EQ(n)=D(n)+\{D(n)-D(n-2)\}\times C0+\{D(n)-D(n-1)\}\times C1+\{D(n)-D(n+1)\}\times C2+\{D(n)-D(n+2)\}\times C3 \quad (7)$$

In this equation, D(n) represents the reproduction signal of the nth cell, EQ(n) represents the signal output value after the predictive waveform equalizing operation, and C0 through C3 represent equalizing coefficients. These equalizing coefficients are fixed coefficients, regardless of the multi-value data pattern.

Figure 7:
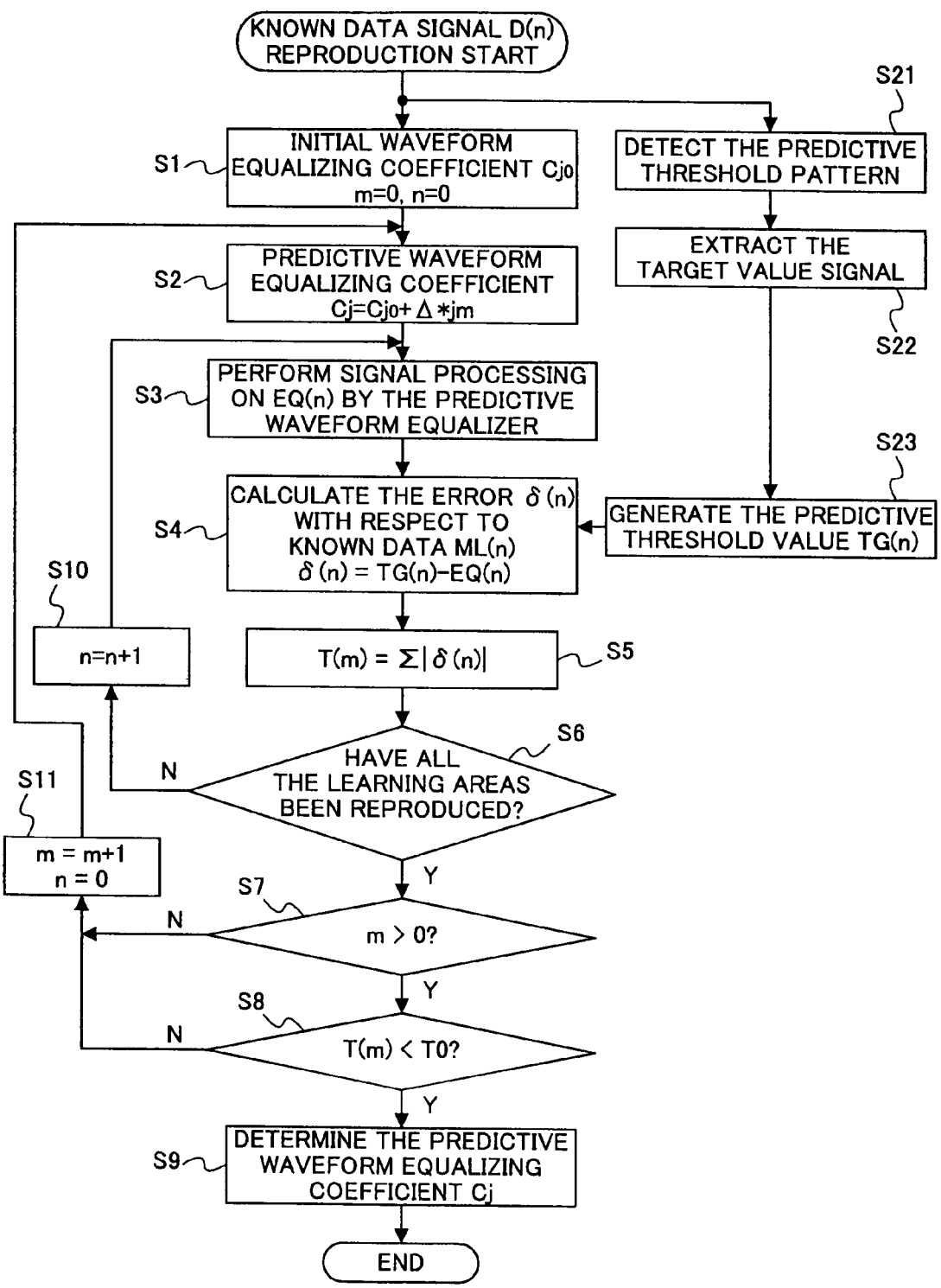
FIG. 7 is a flowchart of an operation algorithm of learning the predictive equalizing coefficients in the multi-value data detecting circuit shown in FIG. 1.

FIG. 7 is a flowchart of an operation algorithm of learning predictive equalizing coefficients.

A known data signal has one learning sector for each N sequential data sectors, as shown in the format of FIG. 6. The multi-value data in the -learning sectors are the known data.

The known data are formed by data in which all the combination patterns (512–8=504 patterns) are repeatedly recorded as well as the target value patterns. The initial equalizing coefficients are prerecorded in an area separate from the data recording area, and information is to be obtained by reproducing the separate area.

However, if the waveform equalizing operation is not optimized, the accurate multi-value data cannot be detected. Therefore, it is more preferable to have the initial equalizing coefficients recorded as binary information, so that the initializing coefficients can be accurately obtained.

The determination of the predictive equalizing coefficients is repeated until the error with respect to the target signal becomes equal to a predetermined value (T0) or smaller. To calculate the error, it is necessary to obtain the information as to the arrangement of the multi-value data of the known data. The information as to the arrangement of the known data is recorded in a memory (not shown) in the information recording and reproducing device shown in FIG. 5, and is used for recording and reproducing learned data. The multi-value signal memory 60 shown in FIG. 5 must have a data capacity equivalent to or larger than the size corresponding to the period of time required for determining the equalizing coefficients. With the large enough data capacity, unknown multi-value data to be reproduced during the predictive equalizing coefficient determining operation and the following detective equalizing coefficient determining operation can be temporarily stored, and data processing can be continuously performed. After the predictive equalizing coefficient determination, learning the detective equalizing coefficients is started upon receipt of a notification of the completion of the predictive equalizing coefficient determination.

In the reproduction of unknown data, the learning results (i.e., the determined predictive equalizing coefficients C0, C1, C2, and C3) are set to the predictive equalizing coefficient calculator 12 shown in FIG. 1, and are then subjected to waveform equalization. Predictive data utilized in the detective waveform equalization are multi-value data obtained by the multi-value data predictor 16 that converts signals subjected to the predictive waveform equalization. Here, the determining threshold values are determined from the detected target value data. The target values are recorded in a predictive threshold value generator 17, and are used as threshold value information by the multi-value data predictor 16.

The learning results (i.e., the predictive equalizing coefficients C0, C1, C2, and C3, and the multi-value data determining threshold values based on the target values) are updated every time one of the learning sectors shown in FIG. 6 is reproduced, and are used for reproducing unknown multi-value data.

Next, the process of learning the detective equalizing coefficients in the multi-value data detecting circuit will be described.

The latter unit of FIG. 1 (i.e., the detective waveform equalizer 31 and the multi-value data detector 34) is used as a circuit structure for detective waveform equalization. Also, a waveform equalizer having the circuit structure shown in FIG. 4 is employed here.

The waveform equalizer shown in FIG. 4 performs a calculating operation based on the following equation (8):

$$EQ'(n) = D(n) + \{D(n) - D(n-2)\} \times C0\ (I, J, K) + \quad (8)$$
$$\{D(n) - D(n-1)\} \times C1\ (I, J, K) +$$
$$\{D(n) - D(n+1)\} \times C2\ (I, J, K) + \{D(n) - D(n+2)\} \times C3\ (I, J, K)$$

In this equation, D(n) represents the reproduction signal of the nth cell, and EQ'(n) represents the signal output value after the detective waveform equalizing operation. Here, C0 (I, J, K), C1 (I, J, K), C2 (I, J, K), and C3 (I, J, K) represent the equalizing coefficients corresponding to the respective patterns (I, J, K). Further, I represents the (n−1)th item of multi-value data, J represents the nth item of multi-value data, and K represents the (n+1)th item of multi-value data.

Figure 8:
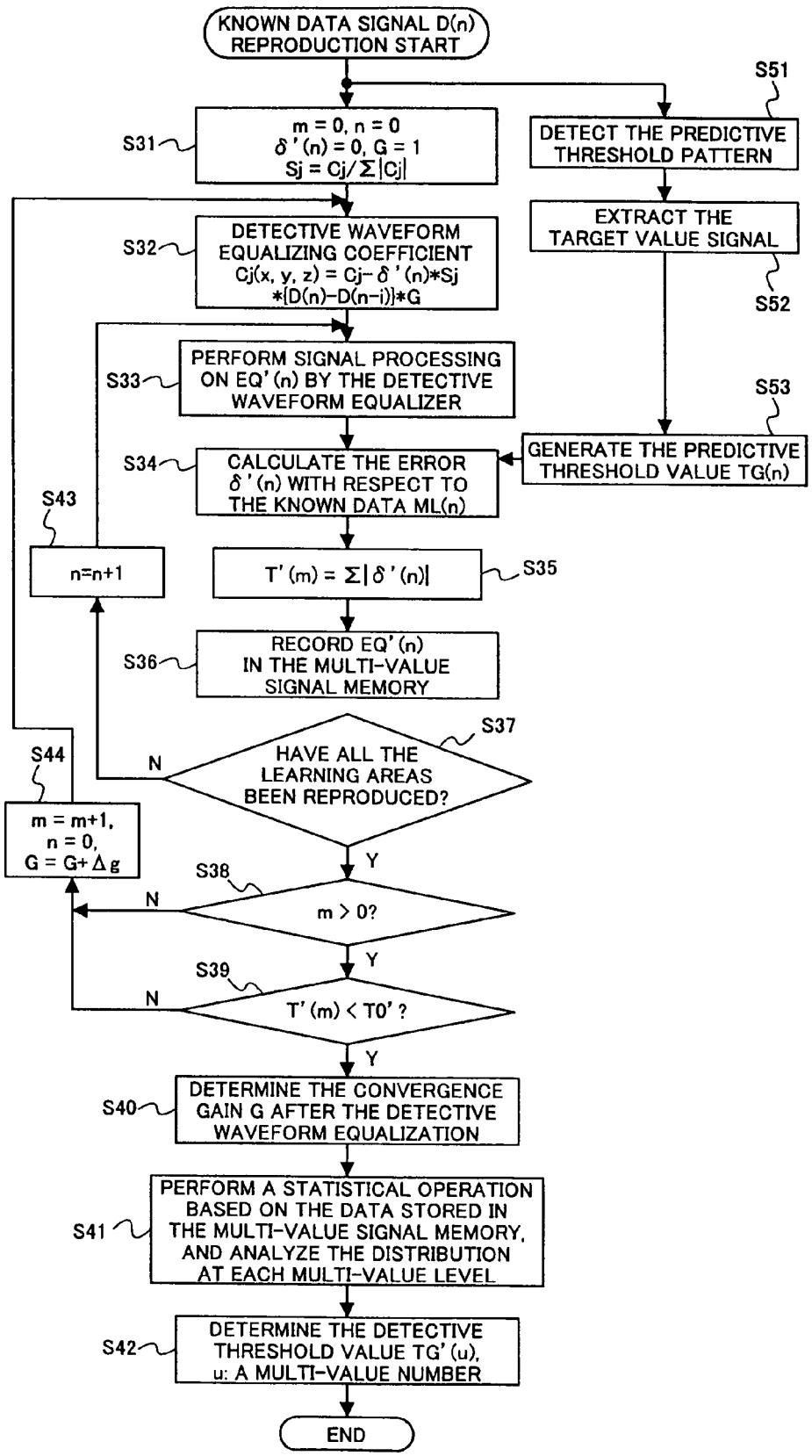
FIG. 8 is a flowchart of an operation algorithm of learning the detective equalizing coefficients in the multi-value data detecting circuit shown in FIG. 1.

FIG. 8 is a flowchart of an operation algorithm of learning the detective equalizing coefficients.

Each known data signal has the format shown in FIG. 6, which is the same as in the predictive waveform equalization. The known data are formed by data in which all the combination patterns (512−8=504 patterns) are repeatedly recorded as well as the target value patterns.

To reproduce the known data and to calculate the waveform equalizing coefficients so that the values of EQ'(n) converge on the target values, the results of at least four sequential cells, for example, the results of EQ(n−2), EQ(n−1), EQ(n), and EQ(n+1) must be calculated based on the equation (7). Therefore, it is necessary to solve the simultaneous equations and obtain the optimum waveform equalizing coefficients for each of the 512 patterns (xyz). This involves an enormous amount of calculation, and requires a very long period of time for the learning.

However, the errors with respect to the target values generated in the predictive waveform equalization are directly proportional to the equalizing coefficients C0, C1, C2, and C3 determined in the predictive waveform equalization based on the equation (7).

Accordingly, where the error with respect to the corresponding target value when the nth item of multi-value data is reproduced is $\delta(n)$, the following equations (9) through (12) can be established.

The error generated from the term $\{D(n)-D(n-2)\}$
$\propto C0/\{|C0|+|C1|+|C2|+|C3|\} \times \ddot{a}(n)$ \quad (9)

The error generated from the term $\{D(n)-D(n-1)\}$
$\propto C1/\{|C0|+|C1|+|C2|+|C3|\} \times \ddot{a}(n)$ \quad (10)

The error generated from the term $\{D(n)-D(n+1)\}$
$\propto C2/\{|C0|+|C1|+|C2|+|C3|\} \times \ddot{a}(n)$ \quad (11)

The error generated from the term $\{D(n)-D(n+2)\}$
$\propto C3/\{|C0|+|C1|+|C2|+|C3|\} \times \ddot{a}(n)$ \quad (12)

From the above equations (9) through (12), the error $\delta(n)$ with respect to the corresponding target value when the nth item of multi-value data is reproduced is determined. Further, the optimum equalizing coefficients C0 (I, J, K), C1 (I, J, K), C2 (I, J, K), and C3 (I, J, K) in the detective waveform equalization can be calculated by the following equations (13) through (16) using the error $\delta$ (n) and the predictive equalizing coefficients C0, C1, C2, and C3. It should be noted that I represents the (n−1)th item of multi-value data, J represents the nth item of multi-value data, and K represents the (n+1)th item of multi-value data.

$$C0(I, J, K)=C0-\ddot{a}(n) \times S0 \times \{D(n)-D(n-2)\} \times G \quad (13)$$

$$C1(I, J, K)=C1-\ddot{a}(n) \times S1 \times \{D(n)-D(n-1)\} \times G \quad (14)$$

$$C2(I, J, K)=C2-\ddot{a}(n) \times S2 \times \{D(n)-D(n+1)\} \times G \quad (15)$$

$$C3(I, J, K)=C3-\ddot{a}(n) \times S3 \times \{D(n)-D(n+2)\} \times G \quad (16)$$

In the above equations, G represents the convergence gain. Also, S0, S1, S2, and S3 are defined by the following equations (17) through (20), where |P| represents the absolute value of P.

$$S0=C0/\{|C0|+|C1|+|C2|+|C3|\} \quad (17)$$

$$S1=C1/\{|C0|+|C1|+|C2|+|C3|\} \quad (18)$$

$$S2=C2/\{|C0|+|C1|+|C2|+|C3|\} \quad (19)$$

$$S3=C3/\{|C0|+|C1|+|C2|+|C3|\} \quad (20)$$

The values C0 (I, J, K), C1 (I, J, K), C2 (I, J, K), and C3 (I, J, K) can be determined from $\delta(n)$ through the operations based on the equations (13) through (16). Accordingly, there is no need to solve the simultaneous equations.

In this manner, the optimum equalizing coefficients can be automatically determined from the error $\delta(n)$ in the nth item of multi-value data and the predictive equalizing coefficients C0, C1, C2, and C3. Thus, the calculation time of the detective equalizing coefficients can be dramatically shortened.

The determination of the detective equalizing coefficients is repeated until the error with respect to the corresponding target value becomes equal to a predetermined value (T0') or smaller.

In the reproduction of unknown data, the learning results (i.e., the determined detective equalizing coefficients C0 (I, J, K), C1 (I, J, K), C2 (I, J, K), and C3 (I, J, K), and the convergence gain G) are set to the detective equalizing coefficient and convergence gain calculator 32 shown in FIG. 1, and waveform equalizing is then performed.

FIG. 9 shows a list of the equalizing coefficients for the detection waveform equalization.

The detective equalizing coefficients are set and stored in the detective equalizing coefficient and convergence gain calculator 32, based on the reproduced known data. As shown in FIG. 9, the setting of the detective equalizing coefficients is performed for each unit of three sequential patterns.

In accordance with the multi-value data obtained by the multi-value data predictor 16, the optimum equalizing coefficients and the convergence gain are read from the detective equalizing coefficient and convergence gain calculator 32. After that, the detective waveform equalization is performed, followed by multi-value determination by the multi-value data detector 34. To determine the multi-value data with high precision, it is more preferable to use the learning results of the multi-value signals calculated in the detective waveform equalization, than to use the target value data learned from the predictive threshold values.

Accordingly, when known data are reproduced and learned, the signal distribution at each multi-value level is subjected to statistical processing based on the results of multi-value data and reproduction signals, and the resultant signals are used as threshold values for the next multi-value determination.

Therefore, the statistical calculating operation of the above threshold values is performed with the multi-value signal memory 36 and the statistical processor 37 shown in FIG. 1, and the resultant threshold values are set to the detective threshold value generator 35. Using these threshold values, the multi-value signals after the detective waveform equalization can be accurately determined. The learning results (i.e., the determined detective equalizing coefficients C0 (I, J, K), C1 (I, J, K), C2 (I, J, K), and C3 (I, J, K), the convergence gain G, and the multi-value data determining threshold values) are updated every time one of the learning sectors shown in FIG. 6 is reproduced, and the updated learning results are used for reproducing unknown multi-value data.

This technique of setting the multi-value data determining threshold values is utilized by the predictive waveform equalizer 11, so that the accuracy in determining the predictive data can be further increased.

Although not shown in the drawings, a statistical operation and a multi-value memory are added to the predictive threshold value generator 17 shown in FIG. 1, so that the threshold values can be learned with the predictive waveform equalizer 11.

In the multi-value determination of unknown data, the detective waveform equalization is performed after the prediction of multi-value data through the predictive waveform equalization, and therefore, a time delay is required.

Accordingly, after the temporary storing of unknown multi-value data in the memory buffer, the predictive waveform equalization and the predictive multi-value determination are finished, and the unknown data are reproduced from the memory buffer. The detective waveform equalization and the multi-value determination are then performed.

Next, an example operation of reproducing unknown data in the multi-value data detecting circuit will be described.

Figure 10:
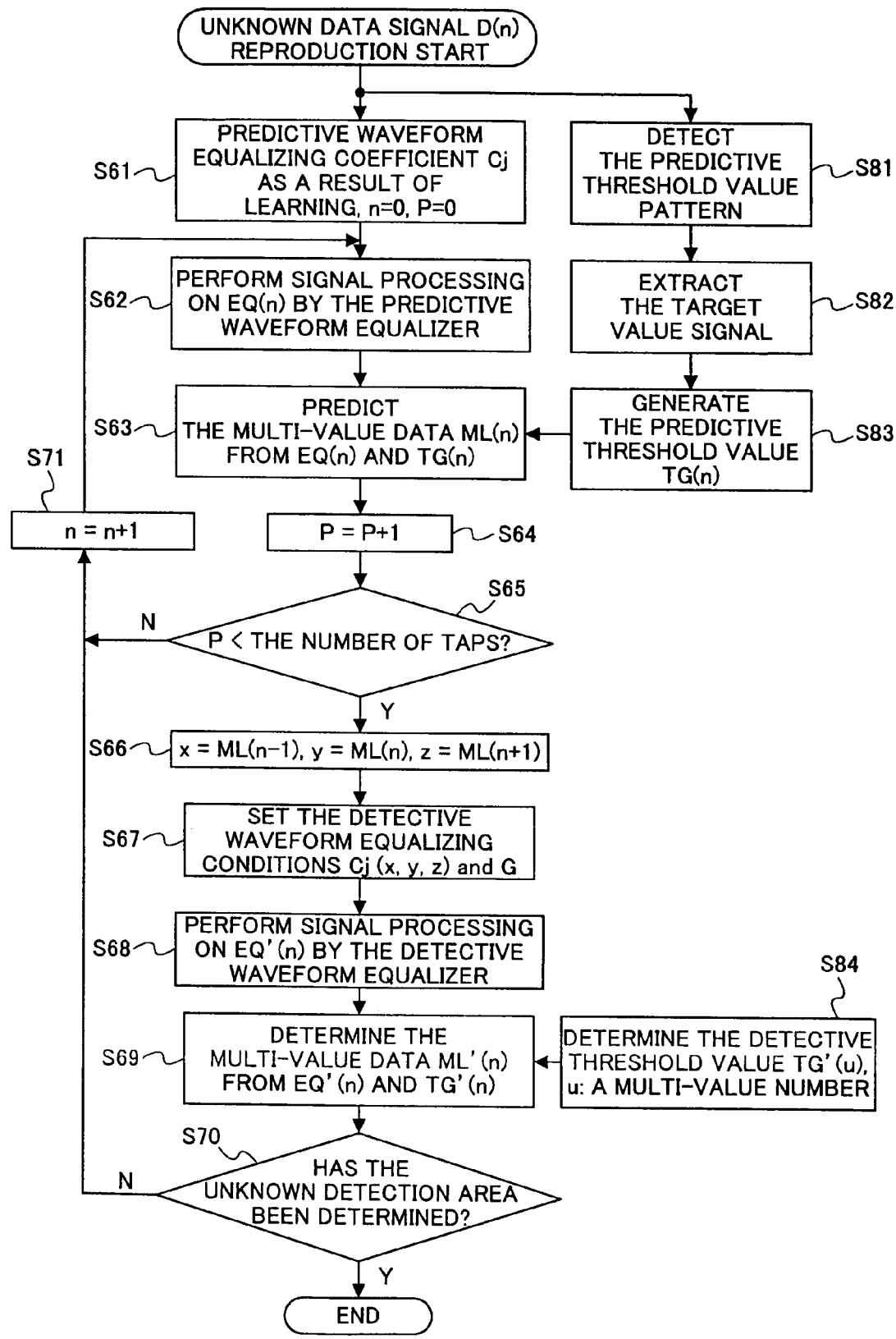
FIG. 10 is a flowchart of an operation algorithm of reproducing unknown data in the multi-value data detecting circuit shown in FIG. 1.

FIG. 10 is a flowchart of an operation algorithm of reproducing unknown data in the multi-value data detecting circuit.

Based on the results obtained through the process of learning the predictive equalizing coefficients and the detective equalizing coefficients, multi-value determination is performed on the unknown data strings. In doing so, the multi-value data in the learning sectors in the format shown in FIG. 6, which has one learning sector for each N sequential unknown data sectors, are used as the known data. Accordingly, based on the results of reproduction of the learning sectors, the multi-value determination is performed on the unknown data sectors. The insertion frequency of the learning sectors (one learning sector is inserted in each N unknown data sectors) is determined from the frequency characteristics of the signal level fluctuations of the optical information recording medium 50.

If a signal level fluctuation is caused with every one rotation of the optical information recording medium 50, for instance, at least four learning sectors need to be inserted in one rotation, so as to follow the fluctuating frequency. If a signal level fluctuation is caused in every radial area (i.e., the signal level fluctuates twice in one rotation), a learning sector should be inserted in every several millimeters in each radial area, so as to follow the fluctuations.

If the signal level fluctuates among optical information recording media 50, learning sectors should be reproduced only from the innermost circumferential area and the outermost circumferential area, which are separate from the data recording area. Such a format is different from the format shown in FIG. 6. In this case, the learning sectors are not inserted in the data area, and recording and reproduction are performed based on the learning results.

The signal level fluctuations may vary with the combinations of optical information recording media and information recording and reproducing devices. Therefore, every time an optical information recording medium is set to the information recording and reproducing device (i.e., every time new optical information is recorded), learning sectors are recorded and reproduced only in the innermost circumferential area and the outermost circumferential area, and the learning is performed through these learning sectors. In this case, learning sectors are not inserted in the data area. Accordingly, recording and reproduction in the data area are performed based on the learning results, so that the signal level fluctuation can be constantly followed.

Next, the results of a learning process performed at a learning frequency of once in N (=128) sectors in the format shown in FIG. 6 will be described. The evaluation results of unknown recording data through such a learning process will also be described. The multi-value data in each one sector consist of 2048 cells (2048×3 bits; octal recording).

Figure 11:
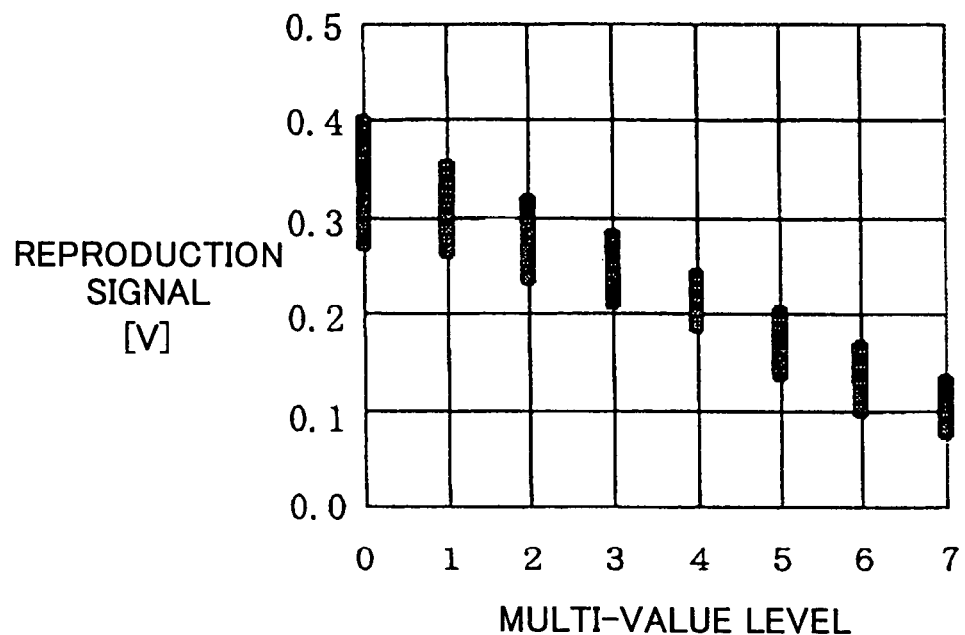
FIG. 11 illustrates the distribution of reproduction signals at the respective multi-value levels prior to waveform equalization by the multi-value data detecting circuit shown in FIG. 1.
Figure 12:
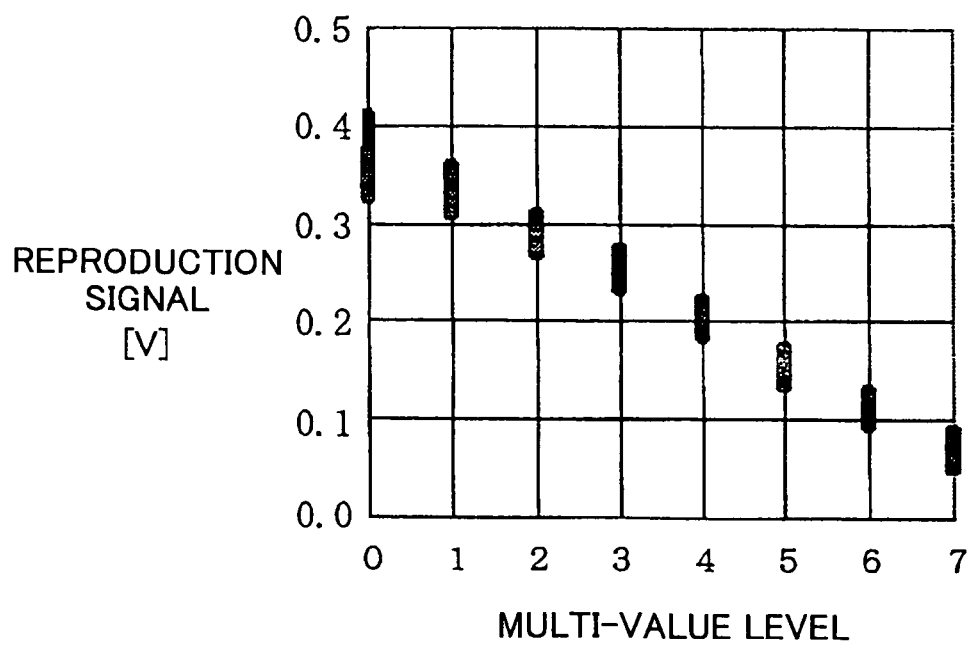
FIG. 12 illustrates the distribution of reproduction signals at the respective multi-value levels after predictive waveform equalization by the multi-value data detecting circuit shown in FIG. 1.
Figure 13:
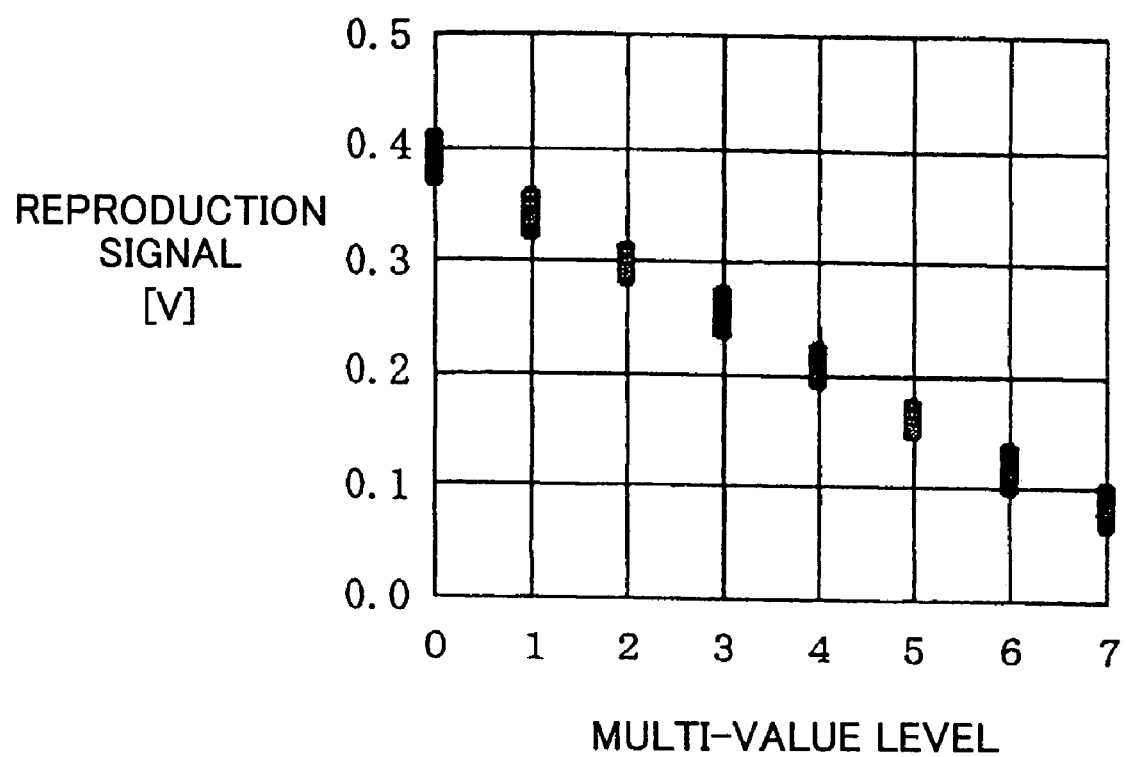
FIG. 13 illustrates the distribution of reproduction signals at the respective multi-value levels after detective waveform equalization by the multi-value data detecting circuit shown in FIG. 1.

FIG. 11 illustrates the distribution of reproduction signals at the respective multi-value levels prior to waveform equalization. FIG. 12 illustrates the distribution of reproduction signals at the respective multi-value levels after predictive waveform equalization. FIG. 13 illustrates the distribution of reproduction signals at the respective multi-value levels after detective waveform equalization.

Through the waveform equalization of this embodiment, the distribution of reproduction signals at the respective multi-value levels can be dramatically improved, and the reproduction signals efficiently converge. Here, the predictive equalizing coefficients C0, C1, C2, and C3, are 0.00, 0.15, 0.18, and −0.01, respectively. Also, the convergence gain G in the detective waveform equalization is 38.

The optical system of the pickup head used here has a recording and reproducing wavelength $\lambda$ of 650 nm, an objective lens of 0.65 NA, and a beam spot diameter BD of approximately 0.8 microns. The cell length is 0.46 microns, and the recording density is 6.52 bits/micron. Compared with a rewritable optical information recording medium (a DVD of 3.75 bits/micron in binary recording) that can be recorded and reproduced with the same pickup head, the recording density in this embodiment is approximately 1.7 times higher. With the largest value and the smallest value of multi-value signals being "1", the evaluation of the distribution at each multi-value level is defined by the average value $\sigma_{avg}$ of the standard deviation. The effects of the waveform equalization of this embodiment were compared, using the average value $\sigma_{avg}$ and the error rate Err of the cell unit in the multi-value determination. The comparison results are as follows:

Prior to waveform equalization:

$\sigma_{avg}$=6.5%, Err=20% to 40%

After predictive waveform equalization:

$\sigma_{avg}$=2.6%, Err=2% to 3%

After detective waveform equalization:

σavg=1.6%, Err=0% to 0.05%

The above results confirm that the average value σavg decreases to ¼ and the error rate Err decreases to 1/400 or lower by virtue of the effects of this embodiment.

In this manner, the multi-value data detecting circuit of this embodiment predicts the states and the degree of influence of the recording marks located in front of and behind the subject recording mark to be reproduced, when reproducing information from reproduction signals having levels multi-valued through modulation of the areas of the recording marks. Depending on the predicted degree of influence, the optimum detective waveform equalization is ultimately performed on each pattern. Thus, interference among codes can be efficiently eliminated through waveform equalization.

Also, where information is to be reproduced from reproduction signals having levels multi-valued through modulation of the areas of the recording marks, the equalizing coefficient conditions are determined for each combination pattern of the three or more sequential recording marks including the a known data value of the recording mark string preceding the subject recording mark, a known data value of the subject recording mark, and a known data value of the recording mark string following the subject recording mark. Accordingly, the conditions for eliminating interference among codes by a waveform equalizing operation can be learned with high precision.

Further, where information is to be reproduced from reproduction signals having levels multi-valued through modulation of the areas of the recording marks, the determining threshold values are determined from the multi-value outputs of the known data after the predictive waveform equalization and the detective waveform equalization. Thus, the threshold values in multi-value determination can be set with high precision.

Also, where information is to be reproduced from reproduction signals having levels multi-valued through modulation of the areas of the recording marks, the equalizing coefficient learning technique and the threshold value learning technique described above are employed. Thus, interference among codes can be eliminated through a waveform equalizing operation with high precision, and precise multi-value determination can be performed on unknown data.

Further, where information is to be reproduced from reproduction signals having levels multi-valued through modulation of the areas of the recording marks, the target value of the signal output of each item of recording data is the signal output value prior to waveform equalization obtained by reproducing three or more recording mark strings containing the same multi-value data. Thus, efficient convergence can be achieved in the waveform equation.

Also, where information is to be reproduced from reproduction signals having levels multi-valued through modulation of the areas of the recording marks, the above target values are set as convergence targets. Thus, efficient convergence can be achieved in the waveform equalization, and the number of equalizing coefficients is reduced by one, compared with the conventional circuit structure (see FIG. 17). Accordingly, the amount of calculation in the process of learning the equalizing coefficients can be advantageously reduced.

Further, where information is to be reproduced from reproduction signals having levels multi-valued through modulation of the areas of the recording marks, data strings including all the combinations of three or more sequential items of multi-value data are repeatedly recorded to form multi-value data strings, and the recording area is periodically formed in an area separate from the data area in which unknown multi-value data are recorded, so that the signal level fluctuations of the optical information recording medium can be constantly followed. Thus, interference among codes can be eliminated in accordance with the signal level fluctuations, and precise multi-value determination can be performed.

Also, where information is to be reproduced from reproduction signals having levels multi-valued through modulation of the areas of the recording marks, pattern strings indicating the convergence targets of waveform equalization are recorded as learning information, and the learning area is periodically formed in an area separate from the data area in which unknown multi-value data are recorded, so that the signal level fluctuations of the optical information recording medium can be constantly followed. Thus, interference among codes can be eliminated, and accurate multi-value determination can be performed.

Further, where information is to be reproduced from reproduction signals having levels multi-valued through modulation of the areas of the recording marks, the errors with respect to the target values generated in the predictive waveform equalization are assumed to be directly proportional to the equalizing coefficients $C_0$, $C_1$, $C_2$, and $C_3$ determined through the predictive waveform equalization based on the equation (7), and to be almost evenly distributed. The detective waveform equalizing coefficients are calculated on this assumption. Accordingly, the optimum equalizing coefficients can be automatically determined from the error $\delta(n)$ of the nth item of multi-value data and the predictive equalizing coefficients $C_0$, $C_1$, $C_2$, and $C_3$. Thus, the time required for calculating the detective equalizing coefficients can be dramatically shortened.

Also, where information is to be reproduced from reproduction signals having levels multi-valued through modulation of the areas of the recording marks, the errors with respect to the target values generated in the predictive waveform equalization are assumed to be directly proportional to the equalizing coefficients $C_0$, $C_1$, $C_2$, and $C_3$ determined through the predictive waveform equalization based on the equation (7), and to be almost evenly distributed. The detective waveform equalizing coefficients are calculated on this assumption, and the convergence gain G is determined so that the errors with respect to the target values can be minimized. Accordingly, the optimum convergence gain G can be automatically determined from the error $\delta(n)$ of the nth item of multi-value data and the predictive equalizing coefficients $C_0$, $C_1$, $C_2$, and $C_3$. Thus, the calculating time required for the detective equalization learning can be dramatically shortened.

Further, where information is to be reproduced from reproduction signals having levels multi-valued through modulation of the areas of the recording marks, the initial predictive equalizing coefficients are recorded in an area separate from the data recording area, and the information is obtained by reproducing the separate area. Thus, the calculation time required for the predictive equalization learning can be dramatically shortened.

Also, where information is to be reproduced from reproduction signals having levels multi-valued through modulation of the areas of the recording marks, the initial predictive equalizing coefficients are recorded in an area separate from the data recording area. The initial predictive equalizing coefficients are recorded as binary information, so that the initial coefficients can be accurately obtained.

Thus, the calculation time required for the predictive equalization learning can be dramatically shortened.

Next, another embodiment of the present invention will be described.

The multi-value data detecting circuit described above is effective in eliminating non-linear interference components among codes. With this multi-value data detecting circuit, the calculation of the equalizing coefficients can be greatly simplified.

However, if the error rate in the predictive determination results is high, the erroneous components due to waveform equalization might increase and the interference components among codes might not be efficiently eliminated.

With the multi-value data detecting circuit shown in FIG. 1, the interference components among codes increases, as the cell length is shortened and the recording density is increased. Accordingly, the error rate in the predictive determining values with the combination of the "fixed equalizer and threshold value verification" becomes higher.

In such a case, the detective waveform equalization is performed based on the predictive determination results having a high error rate. As a result, waveform equalization is performed with incorrect equalizing coefficients, and the determination results after the detective waveform equalization cannot be adequately decreased.

As an example of such a case, the results of recording and reproduction will be shown below. In this recording and reproducing operation, the optical system of the pickup head has a recording and reproducing wavelength $\lambda$ of 650 nm, an objective lens of 0.65 NA, and a beam spot diameter of approximately 0.8 microns. The cell length is 0.40 microns, and the recording density is 7.0 bits/micron.

Predictive determination results:
Error rate 10.1%
Detective determination results with the circuit shown in FIG. 1: Error rate 7.6%

As can be seen from the above results, the previous embodiment has an effect of improving the error rate by approximately 30%.

Figure 14:
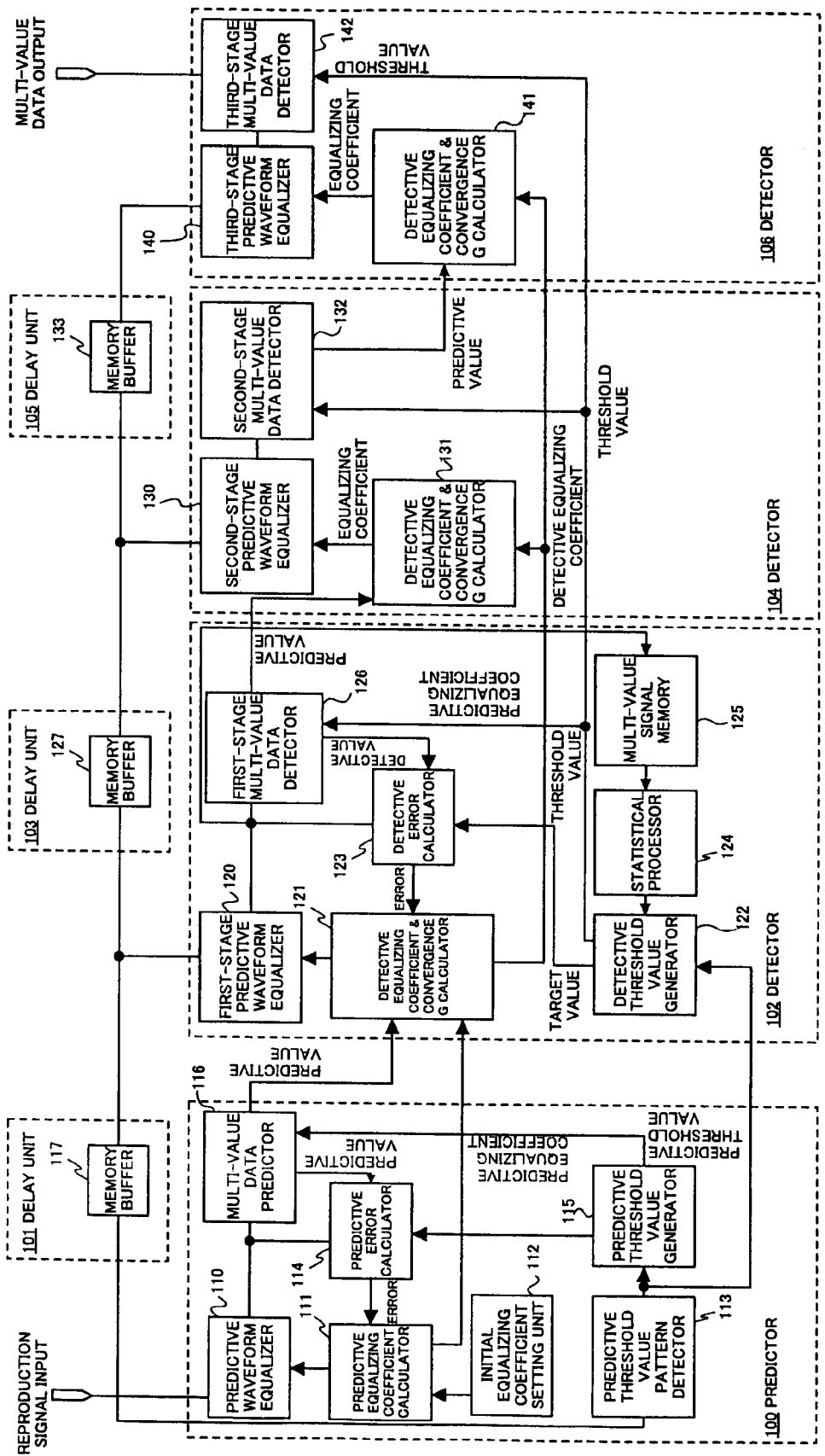
FIG. 14 illustrates the structure of a multi-value data detecting circuit that is another embodiment of the multi-value data recording and reproducing device of the present invention.

To further increase the effect of improving the detection performance, a multi-value data detecting circuit having a circuit structure shown in FIG. 14 is employed in this embodiment. In this circuit structure, the multi-value determining algorithm is improved as follows.

In this multi-value determining algorithm, the detective determination results of the previous embodiment are used as prediction results, and the detective waveform equalization of the previous embodiment based on the prediction results is repeated until the determination results of multi-value data sufficiently converge.

In the previous embodiment employing a waveform equalizer of a 5-tap structure, the optimum waveform equalizing coefficients are determined from the combination of a known data value of the subject recording mark to be reproduced, a known data value of the recording mark string preceding the subject recording mark, and a known data value of the recording mark string following the subject recording mark (see FIG. 9). In this embodiment, on the other hand, the optimum waveform equalizing coefficients are determined from the combination of a known data value of the recording mark string preceding the subject recording mark and a known data value of the recording mark string following the subject recording mark, using an equalizing coefficient list shown in FIG. 15.

The waveform equalizing operation of this embodiment is more indistinct than that of the previous embodiment. In this embodiment, however, the waveform equalizing operation is repeated until the determination results of multi-value data sufficiently converge. In this manner, even if the error rate in the predictive determination values obtained by the "fixed equalizer and threshold value verification" of FIG. 1 is high, the error rate in the detected determination results can be lowered.

The reproduction signals reproduced through recording and reproduction of multi-value data signals by an information record reproducing circuit utilizing the multi-value data detecting circuit shown in FIG. 1 are input into the multi-value data detecting circuit shown in FIG. 14. The same operations as in the previous embodiment are then performed to learn the predictive equalizing coefficients with this multi-value data detecting circuit.

Next, a process of learning the detective equalizing coefficients with this multi-value data detecting circuit will be described. Explanation of the same procedures as in the previous embodiment will be omitted in the following description.

The learning results of multi-value signals calculated through the initial detective waveform equalization shown in FIG. 14 are the same as the learning results used in the latter multi-value determining circuits arranged in series.

In the multi-value determination of unknown data, detective waveform equalization is performed after multi-value data are predicted through predictive waveform equalization, and therefore, a time delay is required.

In view of this, after the unknown multi-value data is temporarily stored in the memory buffer, the predictive waveform equalization and the predictive multi-value determination are finished. The unknown data are then reproduced from the memory buffer, and detective waveform equalization and multi-value determination are successively performed.

In the same manner as the above, the respective determination results are received, and the multi-value determination is performed in detectors 102, 104, and 106 that perform waveform equalizing operations using the same equalizing coefficients. Therefore, after the predetermined period of time required for the predictive multi-value determination has passed since unknown multi-value data are temporarily stored in the memory buffer, the predictive waveform equalization and the predictive multi-value determination are finished. The unknown data are then reproduced from the memory buffer, and the multi-value determination is repeatedly performed.

In a waveform equalizing operation with 5 taps, the learned detective equalizing coefficients C0 (I, J, K), C1 (I, J, K), C2 (I, J, K), and C3 (I, J, K) form a list containing 512×4=2048 coefficients for each combination of the known data values of the subject recording mark to be reproduced, the known data values of the recording mark string preceding the subject recording mark, and the known data values of the recording mark string following the subject recording mark.

To convert this list into an equalizing coefficient list used in this embodiment, the following calculating operation needs to be performed for each combination of the known data values of the recording mark string preceding the subject recording mark and the known data values of the recording mark string following the subject recording mark.

Where x represents a known data value of the recording mark string preceding the subject recording mark, y=0 is a known data value of the recording mark string following the subject recording mark, and a1' represents the equalizing coefficient, the equalizing coefficient is expressed as:

$$a1'=(a1+a2+a3+a4+a5+a6+a7+a8)/8$$

which averages the values regardless of the known value of the subject recording mark to be reproduced.

As a result, the equalizing coefficient list used in this embodiment becomes a list containing 64=4=256 coefficients. The learned equalizing coefficients are the same in all the multi-value determining circuits arranged in series.

Next, an example of a reproducing operation of unknown data performed with this multi-value data detecting circuit will be described.

In the multi-value data detecting circuit of this embodiment, the detective waveform equalization and determination need to be repeated three times before the determination results of multi-value data converge.

Figure 16:
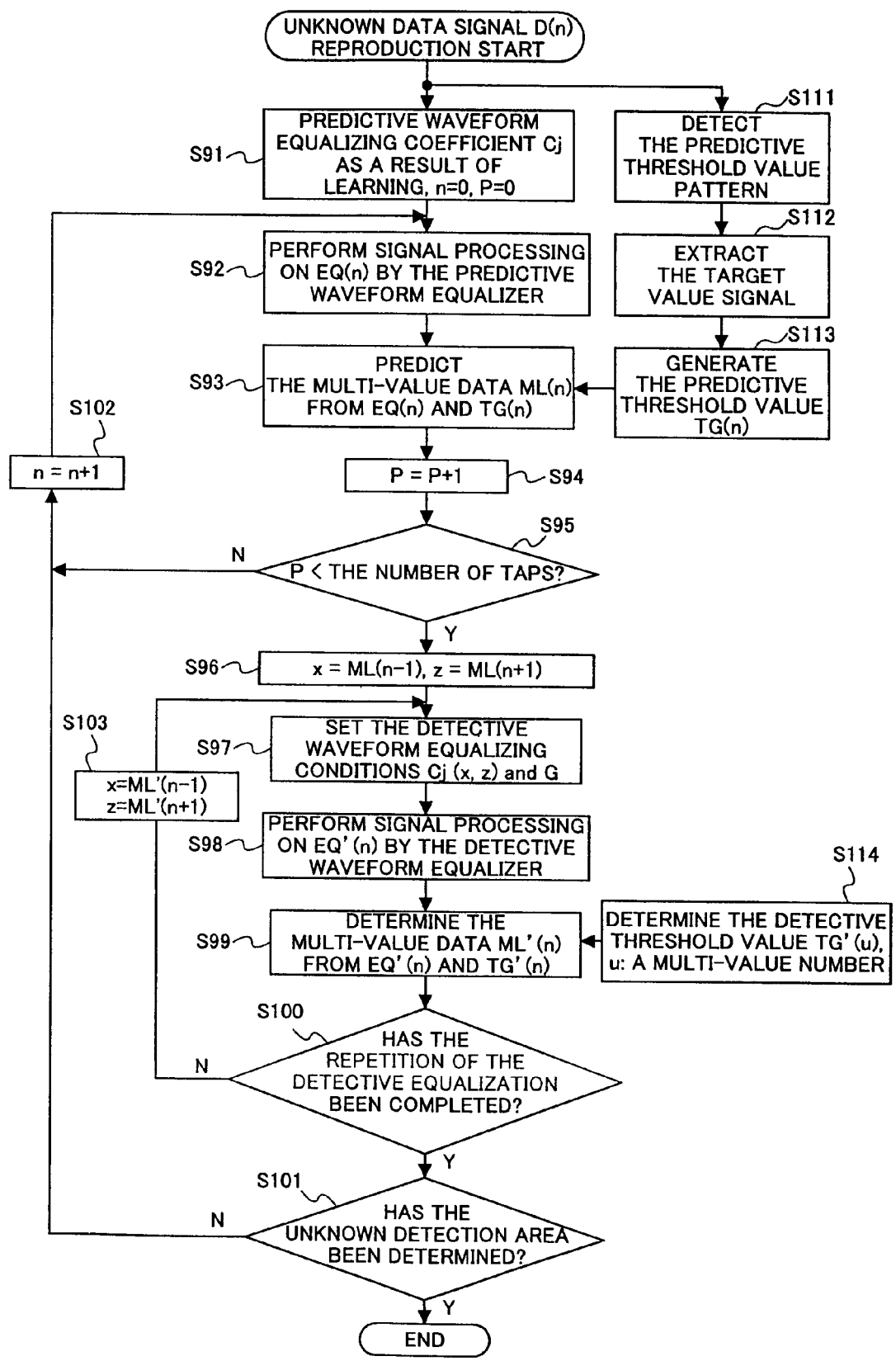
FIG. 16 is a flowchart of an operation algorithm of reproducing unknown data in the multi-value data detecting circuit shown in FIG. 14.

FIG. 16 is a flowchart of an operation algorithm of reproducing unknown data with this multi-value data detecting circuit.

Based on the results of the learning of the predictive equalizing coefficients and the learning of the detective equalizing coefficients, multi-value determination is performed on unknown data strings. Here, the multi-value data in the learning sector in the format shown in FIG. 6 are used as the known data. In the format shown in FIG. 6, one learning sector is inserted in each N sequential unknown data sectors. Accordingly, based on the results of the reproduction of the learning sectors, the multi-value determination of the unknown data sectors is performed. The insertion frequency of the learning sectors (one learning sector is inserted in each N unknown data sectors) is determined by the frequency characteristics of the signal level fluctuations of the optical information recording medium.

If a signal level fluctuation is caused with every one rotation of the optical information recording medium 50, for instance, at least four learning sectors need to be inserted in one rotation, so as to follow the fluctuating frequency. If a signal level fluctuation is caused in each radial area, a learning sector should be inserted in every several millimeters in each radial area, so as to follow the fluctuations.

When the learning results are to be updated, it is preferable to add the previous learning results as well as newly reproduced learning information to the learning results, so that the learning results are not adversely affected by a sudden change due to a defect or the like.

In a case where the learning results are calculated through a statistical operation on 16 learning sectors, for example, the "information of the first learning sector of the 16 learning sectors" is replaced with the "newly reproduced learning sector information" in the statistical operation. In this manner, the latest learning result can be reflected in the updated learning results, and the adverse influence from a "sudden change due to a defect" can be prevented in the learning process.

If a signal level fluctuation is caused every time a new optical information recording medium 50 is set, learning sectors should be recorded in and reproduced only from the innermost circumferential area and the outermost circumferential area, which are separate from the data recording area. Such a format is different from the format shown in FIG. 6. In this case, the learning sectors are not inserted in the data area, and recording and reproduction are performed based on the learning results.

The signal level fluctuations may vary with the combinations of optical information recording media and information recording and reproducing devices. Therefore, every time an optical information recording medium is set to the information recording and reproducing device (i.e., every time new optical information is recorded), the learning sectors are learned through recording and reproduction in the innermost circumferential area and the outermost circumferential area. In this case, learning sectors are not inserted in the data area. Accordingly, recording and reproduction are performed based on the learning results, so that the signal level fluctuations can be constantly followed.

Next, the results of learning at a frequency of one in N (=128) sectors in the format shown in FIG. 6 will be described. The evaluation results of unknown recording data in such a case will also be described. The multi-value data in each one sector consist of 2048 cells (2048×3 bits; octal recording).

FIG. 11 illustrates the distribution of reproduction signals at the respective multi-value levels prior to waveform equalization. FIG. 12 illustrates the distribution of reproduction signals at the respective multi-value levels after predictive waveform equalization. FIG. 13 illustrates the distribution of reproduction signals at the respective multi-value levels after detective waveform equalization.

Through the waveform equalization of this embodiment, the distribution of reproduction signals at the respective multi-value levels can be dramatically improved, and the reproduction signals efficiently converge. Here, the predictive equalizing coefficients C0, C1, C2, and C3, are −0.11, 0.41, 0.49, and −0.13, respectively. Also, the convergence gain G of the detective waveform equalization is 150.

The optical system of the pickup head has a recording and reproducing wavelength $\lambda$ of 650 nm, an objective lens of 0.65 NA, and a beam spot diameter BD of approximately 0.8 microns. The cell length is 0.40 microns, and the recording density is 7.0 bits/micron. Compared with a rewritable optical information recording medium (a DVD of 3.75 bits/micron in binary recording) that can be recorded and reproduced with the same pickup head, the recording density in this embodiment is approximately 2.0 times higher. With the largest value and the smallest value of the multi-value signals being "1", the evaluation of the distribution at each multi-value level is defined by the average value σ avg of the standard deviation. The effects of the waveform equalization of this embodiment were compared, using the average value σavg and the error rate Err of the cell unit in the multi-value determination. The comparison results are as follows:

Prior to waveform equalization:

σavg=13.5%, Err=40% to 50%

After predictive waveform equalization:

σavg=3.2%, Err=8% to 10%

After detective waveform equalization:

σavg=1.8%, Err=0% to 0.2%

The above results confirm that the average value σavg decreases to 1/8 and the error rate Err decreases to 1/200 or lower by virtue of the effects of this embodiment.

In this manner, the multi-value data detecting circuit of this embodiment predicts the states and the degree of influence of the recording marks located in front of and behind the subject recording mark to be reproduced, when reproducing information from reproduction signals having levels multi-valued through modulation of the areas of the recording marks. Depending on the predicted degree of influence, the optimum detective waveform equalization is ultimately performed on each pattern. Also, based on the detection results, the detective waveform equalization is repeated. Thus, interference among codes can be eliminated through waveform equalization with high precision.

Also, where information is to be reproduced from reproduction signal having levels multi-valued through modulation of the areas of the recording marks, the equalizing coefficient conditions are determined for each combination pattern of the three or more sequential recording marks including a known data value of the recording mark string preceding the subject recording mark, a known data value of the subject recording mark, and a known data value of the recording mark string following the subject recording mark. Accordingly, the conditions for eliminating interference among codes by a waveform equalizing operation can be learned with high precision.

Further, where information is to be reproduced from reproduction signals having levels multi-valued through modulation of the areas of the recording marks, data strings including all the combinations of the three or more sequential items of multi-value data are repeatedly recorded to form multi-value data strings, and the recording area is periodically formed in an area separate from the data area in which unknown multi-value data are recorded, so that the signal level fluctuations of the optical information recording medium can be constantly followed. Furthermore, excellent learning effects can be achieved despite a sudden change due to a defect or the like. Thus, interference among codes can be eliminated in accordance with the signal level fluctuations, and precise multi-value determination can be performed.

Also, where information is to be reproduced from reproduction signals having levels multi-valued through modulation of the areas of the recording marks, pattern strings indicating the convergence targets of waveform equalization are recorded as learning information, and the learning area is periodically formed in an area separate from the data area in which unknown multi-value data are recorded, so that the signal level fluctuations of the optical information recording medium can be constantly followed. Furthermore, excellent learning effects can be achieved despite a sudden change due to a defect or the like. Thus, interference among codes can be eliminated, and precise multi-value determination can be performed in accordance with the frequency characteristics of the signal level variations of the optical information recording medium.

It should be noted that the present invention is not limited to the embodiments specifically disclosed above, but other variations and modifications may be made without departing from the scope of the present invention.

The present application is based on Japanese priority application No. 2002-112544 filed on Apr. 15, 2002 with the Japanese Patent Office, the entire contents of which are hereby incorporated by reference.

What is claimed is:

1. A multi-value data recording and reproducing device that varies the sizes of recording marks in accordance with multi-value (0, 1, 2, . . . (m−1): m being an integer of 3 or greater) data on an optical information recording medium, and detects the multi-value data through predetermined signal processing on signals obtained by scanning the recording marks with an optical spots, the multi-value data recording and reproducing device comprising:
a predictor that predictively determines the multi-value data;
a delay unit that delays the predetermined signal processing by a period of time required for the predictive determination by the predictor;
a determiner that determines the multi-value data through waveform equalization based on predictive data that are prediction results from the predictor; and
a waveform equalizing coefficient learning unit that reproduces an area on the optical information recording medium in which known multi-value data are prerecorded, determines such a predictive waveform equalizing coefficient that the signal output of each item of the multi-value data subjected to signal processing by a predictive waveform equalizing circuit has the smallest possible error with respect to a target value, and also determines such a detective waveform equalizing coefficient that the signal output of each item of the multi-value data subjected to signal processing by a detective waveform equalizing circuit has the smallest possible error with respect to a target value, the detective waveform equalizing coefficient being determined for each combination pattern of three or more sequential recording marks including a known data value of a recording mark string that precedes a subject recording mark, a known data value of the subject recording mark, and a known data value of a recording mark string that follows the subject recording mark.

2. The multi-value data recording and reproducing device as claimed in claim 1, further comprising a multi-value data detecting threshold value learning unit that determines a predictive threshold value that is a multi-value data detecting threshold value used for predicting the multi-value data based on the signal output of each item of the multi-value data subjected to the waveform equalization with the predictive waveform equalizing coefficient, and determines a detective threshold value that is a multi-value detecting threshold value for ultimately detecting the multi-value data based on the signal output of each item of the multi-value data subjected to the waveform equalization with the detective waveform equalizing coefficient.

3. The multi-value data recording and reproducing device as claimed in claim 2, further comprising an ultimate decision unit that, when reproducing unknown multi-value recording data from the optical information recording medium through signal processing based on the predictive waveform equalizing coefficient, the detective waveform equalizing coefficient, the predictive threshold value, and the detective threshold value, predictively determines the multi-value data after performing waveform equalization with a prediction-only waveform equalizing circuit, performs waveform equalization under equalizing conditions set in accordance with combination patterns predicted by the detective waveform equalizing circuit with reference to the combination patterns of three or more sequential recording marks including a predictive value of the recording mark string that precedes the subject recording mark, a predictive value of the subject recording mark, and a predictive value of the recording mark string that follows the subject recording mark, and ultimately detects the multi-value data from a reproduction signal subjected to signal processing through the waveform equalization, the predictive values being included in predictive data obtained through the predictive determination of the multi-value data.

4. The multi-value data recording and reproducing device as claimed in claim 1, wherein the target value of the signal output of each item of the multi-value data is a signal output value that can be obtained by reproducing three or more sequential recording mark strings containing the same multi-value data prior to the waveform equalization.

5. The multi-value data recording and reproducing device as claimed in claim 2, wherein:

the predictive waveform equalizing circuit is a modulo adder circuit that includes three or more taps; and the modulo adder circuit is formed by a circuit that operates based on the following equation:

$$EQ(n)=D(n)+\Sigma_i\{D(n)-D(n-i)\}\times Cj$$

where a waveform equalizing operation is performed on a signal output from the nth recording mark, D(n) represents a signal output prior to the waveform equalizing operation performed on the nth recording mark, i and j vary with the number of taps, Cj represents the predictive waveform equalizing coefficient, and EQ(n) represents a signal output after the waveform equalizing operation.

6. The multi-value data recording and reproducing device as claimed in claim 2, wherein:

the detective waveform equalizing circuit is a modulo adder circuit that includes three or more taps; and the modulo adder circuit is formed by a circuit that operates based on the following equation:

$$EQ'(n)=D'(n)+\Sigma_i\{D'(n)-D'(n-i)\}\times Cj'$$

where a waveform equalizing operation is performed on a signal output from the nth recording mark, D'(n) represents a signal output after an initial waveform equalizing operation performed on the nth recording mark, i and j vary with the number of taps, Cj' represents the detective waveform equalizing coefficient, and EQ'(n) represents a signal output after a late waveform equalizing operation.

7. The multi-value data recording and reproducing device as claimed in claim 1, wherein: the prerecorded known multi-value data is formed by a multi-value data string in which a data string including all the combinations of three or more sequential items of multi-value data is repeatedly recorded; and the optical information recording medium has a recording area that is separate from a data area in which unknown multi-value data are recorded, the recording area being periodically formed on the optical information recording medium, and recording and reproduction being performed in the recording area.

8. The multi-value data recording and reproducing device as claimed in claim 1, wherein: the prerecorded known multi-value data is formed by a data string including all the combinations of three or more sequential items of multi-value data, and a data string in which a pattern of three or more sequential recording mark strings including multi-value data having the same target value of the signal output of each item of recording data is repeatedly recorded; and the optical information recording medium has a recording area that is separate from a data area in which unknown multi-value data are recorded, the recording area being periodically formed on the optical information recording medium, and recording and reproduction being performed in the recording area.

9. The multi-value data recording and reproducing device as claimed in claim 6, wherein: the detective waveform equalizing coefficient Cj' is determined from δ(n) of the following equation:

$$Cj'=Ci-\delta(n)\times Sj\times\{D(n)-D(n-i)\}\times G$$

where δ(n) represents the error between the target value and a reproduction signal after a predictive waveform equalizing operation on the nth recording mark, Cj represents the predictive waveform equalizing coefficient, G represents a convergence gain, Sj is equal to Cj/Σ|Cj|(|Cj| being the absolute value of Cj), and the error generated from the term {D(n)−D(n−i)} varies with the proportion of the equalizing coefficient of Cj.

10. The multi-value data recording and reproducing device as claimed in claim 9, wherein the convergence gain G is determined so that the error between the target value and each signal output after the detective waveform equalizing operation is minimized.

11. The multi-value data recording and reproducing device as claimed in claim 1, wherein an initial value of the predictive waveform equalizing coefficient is prerecorded as system information on the optical information recording medium.

12. The multi-value data recording and reproducing device as claimed in claim 11, wherein the initial value of the predictive waveform equalizing coefficient prerecorded on the optical information recording medium is recorded as multi-value recording data having a smaller number of values than the number of values in the multi-value data recorded in the data area.

13. The multi-value data recording and reproducing device as claimed in claim 11, wherein:

the initial value of the predictive waveform equalizing coefficient prerecorded on the optical information recording medium is reproduced;

the area in which the known multi-value data are prerecorded is reproduced; and the predictive equalizing coefficient is determined so that the error between the target value and the signal output of each item of the multi-value data is minimized.

14. A multi-value data recording and reproducing device that varies the sizes of recording marks in accordance with multi-value (0, 1, 2, . . . , (m−1): m being an integer of 3 or greater) data on an optical information recording medium, and detects the multi-value data through predetermined signal processing on signals obtained by scanning the recording marks with an optical spot, the multi-value data recording and reproducing device comprising:

a predictor that predictively determines the multi-value data;

a delay unit that delays the predetermined signal processing by a period of time required for the predictive determination by the predictor;

a determiner that determines the multi-value data through waveform equalization based on predictive data that are prediction results from the predictor, the combination of the delay unit and the determiner being repeatedly arranged in series, so that the waveform equalization is repeated until the determination results of the multi-value data converge, with determination results from the determiner being used as predictive data; and a detective waveform equalizing coefficient learning unit that reproduces an area on the optical information recording medium in which known multi-value data are prerecorded, determines such a predictive waveform equalizing coefficient that the signal output of each item of the multi-value data subjected to signal processing by a predictive waveform equalizing circuit has the smallest possible error with respect to a target value, and also determines such a detective waveform equalizing coefficient that the signal output of each item of the multi-value data subjected to signal processing by a detective waveform equalizing circuit has the smallest possible error with respect to a target value, the detective waveform equalizing coefficient being determined for each combination pattern of three or more sequential recording marks including combinations of a known data value of a recording mark string that precedes a subject recording mark and a known data value of a recording mark string that follows the subject recording mark, but excluding any known data value of the subject recording mark to be reproduced.

15. The multi-value data recording and reproducing device as claimed in claim 14, further comprising a multi-value data detecting threshold value learning unit that determines a predictive threshold value that is a multi-value data detecting threshold value used for predicting the multi-value data based on the signal output of each item of the multi-value data subjected to the waveform equalization with the predictive waveform equalizing coefficient, and determines a detective threshold value that is a multi-value detecting threshold value used for ultimately detecting the multi-value data based on the signal output of each item of the multi-value data subjected to the waveform equalization with the detective waveform equalizing coefficient, the determination of the detective threshold value being based on a signal output value that has been only once subjected to signal processing by the detective waveform equalizing circuit.

16. The multi-value data recording and reproducing device as claimed in claim 15, further comprising a repetitive processing unit that, when reproducing unknown multi-value recording data from the optical information recording medium through signal processing based on the predictive waveform equalizing coefficient, the detective waveform equalizing coefficient, the predictive threshold value, and the detective threshold value, predictively determines the multi-value data after a waveform equalizing operation by a prediction-only waveform equalizing circuit, performs waveform equalization under equalizing conditions that are set in accordance with each combination pattern predicted by the detective waveform equalizing circuit with reference to combination patterns of three or more sequential recording marks including a predictive value of the recording mark string that precedes the subject recording mark and a predictive value of the recording mark string that follows the subject recording mark, but excluding any known data value of the subject recording mark to be reproduced among the predictive data obtained through the predictive determination, detects the multi-value data using a reproduction signal subjected to signal processing through the waveform equalization, performs multi-value determination on the multi-value data, and repeats the waveform equalization using determination results of the multi-value as predictive data until the determination results of the multi-value data converge.

17. The multi-value data recording and reproducing device as claimed in claim 14, wherein the target value of the signal output of each item of the multi-value data is a signal output value that can be obtained by reproducing three or more sequential recording mark strings containing the same multi-value data prior to the waveform equalization.

18. The multi-value data recording and reproducing device as claimed in claim 15, wherein:
the predictive waveform equalizing circuit is a modulo adder circuit that includes three or more taps; and
the modulo adder circuit is formed by a circuit that operates based on the following equation:

$EQ(n)=D(n)+\Sigma_i\{D(n)-D(n-i)\}\times Cj$ where a waveform equalizing operation is performed on a signal output of the nth recording mark, D(n) represents a signal output prior to the waveform equalizing operation performed on the nth recording mark, i and j vary with the number of taps, Cj represents the predictive waveform equalizing coefficient, and EQ(n) represents a signal output after the waveform equalizing operation.

19. The multi-value data recording and reproducing device as claimed in claim 15, wherein:
the detective waveform equalizing circuit is a modulo adder circuit that includes three or more taps; and
the modulo adder circuit is formed by a circuit that operates based on the following equation:

$EQ'(n)=D'(n)+\Sigma_i\{D'(n)-D'(n-i)\}\times Cj'$ where a waveform equalizing operation is performed on a signal output of the nth recording mark, D'(n) represents a signal output after an initial waveform equalizing operation performed on the nth recording mark, i and j vary with the number of taps, Cj' represents the detective waveform equalizing coefficient, and EQ'(n) represents a signal output after a late waveform equalizing operation.

20. The multi-value data recording and reproducing device as claimed in claim 14, wherein:
the prerecorded known multi-value data is formed by a multi-value data string in which a data string including all the combinations of three or more sequential items of multi-value data is repeatedly recorded;
the optical information recording medium has a recording area that is separate from a data area in which unknown multi-value data are recorded, the recording area being periodically formed on the optical information recording medium, and recording and reproduction being performed in the recording area;
when the multi-value data to be reproduced are determined, learning information is updated through a statistical Operation in which the latest learning results are added to the learning results already recorded and reproduced.

21. The multi-value data recording and reproducing device as claimed in claim 14, wherein:
the prerecorded known multi-value data is formed by a data string containing all the combinations of three or more sequential items of multi-value data, and a data string in which a pattern of three or more sequential recording mark strings including multi-value data having the same target value for the signal output of each item of recording data is repeated recorded;
the optical information recording medium has a recording area that is separate from a data area in which unknown multi-value data are recorded, the recording area being periodically formed on the optical information recording medium, and recording and reproduction being performed in the recording area; and
when the multi-value data to be reproduced are determined, learning information is updated through a statistical operation in which the latest learning results are added to the learning results already recorded and reproduced.

22. The multi-value data recording and reproducing device as claimed in claim 19, wherein:
the detective waveform equalizing coefficient Cj' is determined from $\delta(n)$ of the following equation:

$Cj'=Ci-\delta(n)\times Sj\times\{D(n)-D(n-i)\}\times G$ where $\delta(n)$ represents the error between the target value and a reproduction signal after a predictive waveform equalizing operation on the nth recording mark, Cj represents the predictive waveform equalizing coefficient, G represents a convergence gain, Sj is equal to $C_j/\Sigma|C_j|$ ($|C_j|$ being the absolute value of $C_j$), and the error generated from the term $\{D(n)-D(n-i)\}$ varies with the proportion of the equalizing coefficient of $C_j$.

23. The multi-value data recording and reproducing device as claimed in claim 22, wherein the convergence gain G is determined so that the error between the target value and each signal output after the detective waveform equalizing operation is minimized.

24. The multi-value data recording and reproducing device as claimed in claim 14, wherein an initial value of the predictive waveform equalizing coefficient is prerecorded as system information on the optical information recording medium.

25. The multi-value data recording and reproducing device as claimed in claim 24, wherein the initial value of the predictive waveform equalizing coefficient prerecorded on the optical information recording medium is recorded as multi-value recording data having a smaller number of values than the number of values in the multi-value data recorded in the data area.

26. The multi-value data recording and reproducing device as claimed in claim 24, wherein:
- the initial value of the predictive waveform equalizing coefficient prerecorded on the optical information recording medium is reproduced;
- the area in which the known multi-value data are prerecorded is reproduced; and
- the predictive equalizing coefficient is determined so that the error between the target value and the signal output of each item of the multi-value data is minimized.

* * * * *